United States Patent
Bean et al.

(10) Patent No.: US 11,395,519 B2
(45) Date of Patent: Jul. 26, 2022

(54) POWERED GARMENTS, PORTABLE DEVICES CONTROLLING POWERED GARMENTS, CHARGERS FOR POWERED GARMENTS, ENCLOSURES FOR STORING POWERED GARMENTS, AND INTERCONNECTIONS OF POWERED GARMENTS

(71) Applicant: Tech Gear 5.7, Inc., San Marcos, CA (US)

(72) Inventors: K C Bean, Vista, CA (US); Tyson J. Mackjust, Oceanside, CA (US)

(73) Assignee: TECH GEAR 5.7, INC., San Marcos, CA (US)

( * ) Notice: Subject to any disclaimer, the term of this patent is extended or adjusted under 35 U.S.C. 154(b) by 285 days.

(21) Appl. No.: 16/703,825

(22) Filed: Dec. 4, 2019

(65) Prior Publication Data

US 2020/0383397 A1 Dec. 10, 2020

Related U.S. Application Data

(63) Continuation of application No. 16/703,038, filed on Dec. 4, 2019, which is a continuation of application
(Continued)

(51) Int. Cl.
*A41D 1/00* (2018.01)
*G06F 1/16* (2006.01)
(Continued)

(52) U.S. Cl.
CPC ............. *A41D 1/005* (2013.01); *A41D 1/002* (2013.01); *A41D 13/005* (2013.01); *G06F 1/163* (2013.01);
(Continued)

(58) Field of Classification Search
CPC ...... A41D 1/005; A41D 1/002; A41D 13/005; A41D 13/0051; A41D 13/0052;
(Continued)

(56) References Cited

U.S. PATENT DOCUMENTS 5,730,006 A * 3/1998 Conley .................. A47G 25/54
223/51
9,770,084 B1 * 9/2017 Shiekh .................. A45C 15/00
(Continued)

*Primary Examiner* — Ismael Izaguirre
(74) *Attorney, Agent, or Firm* — Anatoly S. Weiser, Esq.; IPLCounsel

(57) ABSTRACT

In selected examples, a clothes storage system includes a garment holder designed to receive and store at least one garment, an electromagnetic radiator attached to the garment holder, power circuitry configured to provide electrical drive to the electromagnetic radiator to cause the electromagnetic radiator to radiate radio frequency (RF) power, and a data interface configured to establish short range wireless communication links. The garment holder may be, e.g., a clothes hanger, a garment bag, a travel garment bag, or a walled enclosure such as a closet in a dwelling or an office. The data interface may be a short range RF transceiver, e.g., a Bluetooth® transceiver. The radiated RF power is received by the powered garments in/on the garment holder and converted into DC charging power used to recharge batteries of the powered garments. The data interface may allow the powered garments to communicate with external networks, e.g., the Internet.

11 Claims, 26 Drawing Sheets

Related U.S. Application Data

No. 16/562,415, filed on Sep. 5, 2019, which is a continuation-in-part of application No. 16/552,889, filed on Aug. 27, 2019.

(60) Provisional application No. 62/858,261, filed on Jun. 6, 2019.

(51) Int. Cl.
  *A41D 13/005* (2006.01)
  *H05B 3/34* (2006.01)
  *H05B 1/02* (2006.01)
  *A47F 5/08* (2006.01)

(52) U.S. Cl.
  CPC .......... *H05B 1/0272* (2013.01); *H05B 3/342* (2013.01); *A47F 5/08* (2013.01); *F25D 2400/26* (2013.01)

(58) Field of Classification Search
  CPC .. A41D 2400/10; A41D 2400/12; A41D 1/00; G06F 1/163; H05B 1/0272; H05B 3/342; A47F 5/08; F25D 2400/26; H01M 10/44; A47G 25/14–48
  See application file for complete search history.

(56) References Cited

U.S. PATENT DOCUMENTS

| | | | | |
|---|---|---|---|---|
| 2002/0154518 | A1* | 10/2002 | Elferich | H02J 50/12 |
| | | | | 363/15 |
| 2018/0169994 | A1* | 6/2018 | Burwell | B32B 9/047 |
| 2018/0289189 | A1* | 10/2018 | Lazzi | H02J 7/025 |
| 2018/0323635 | A1* | 11/2018 | Fetters | A47G 25/00 |
| 2018/0352875 | A1* | 12/2018 | Riehl | H01F 27/40 |
| 2019/0060583 | A1* | 2/2019 | Avuthu | A61M 5/445 |
| 2020/0343776 | A1* | 10/2020 | Beckman | H02J 50/40 |

* cited by examiner

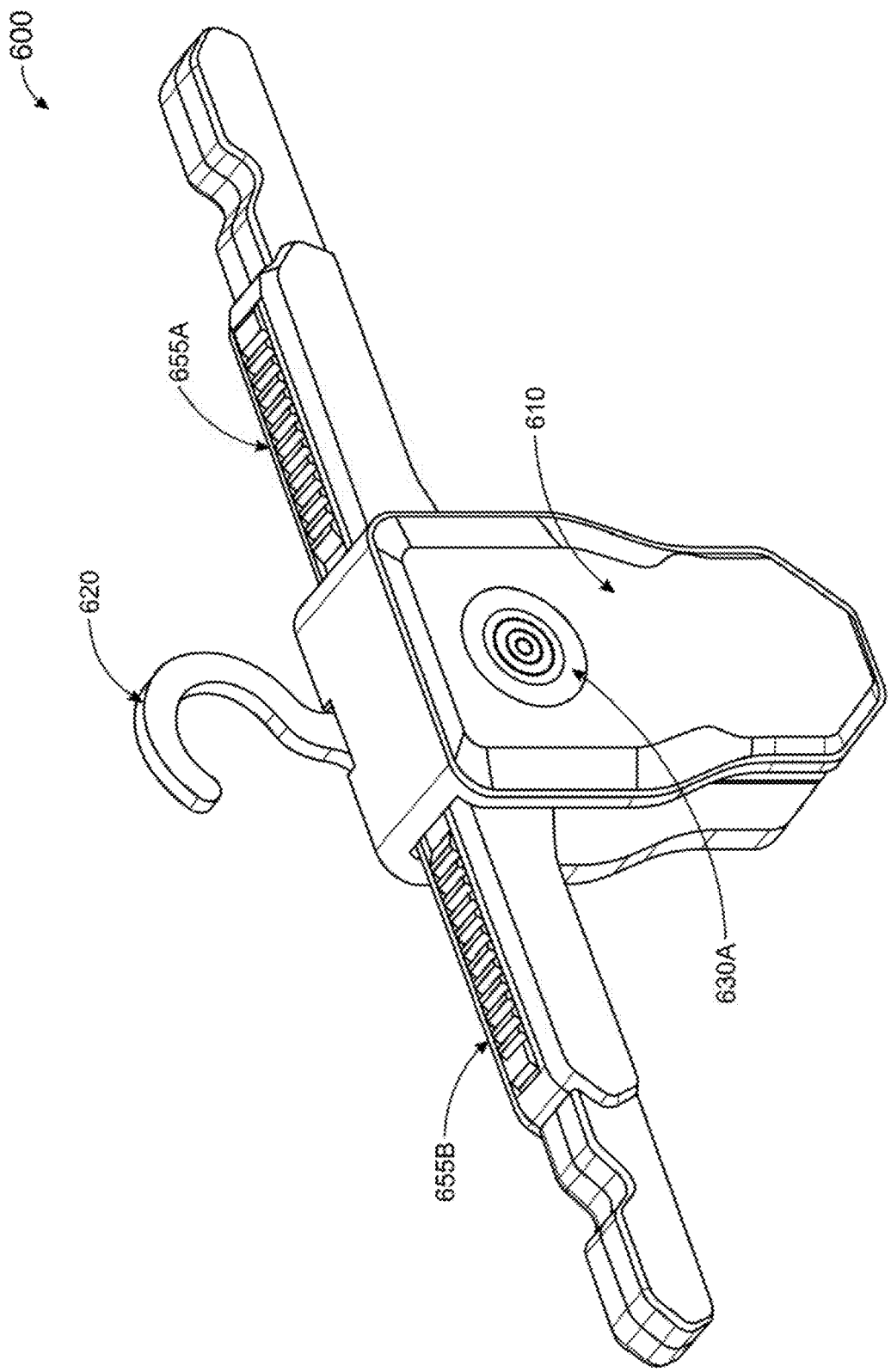

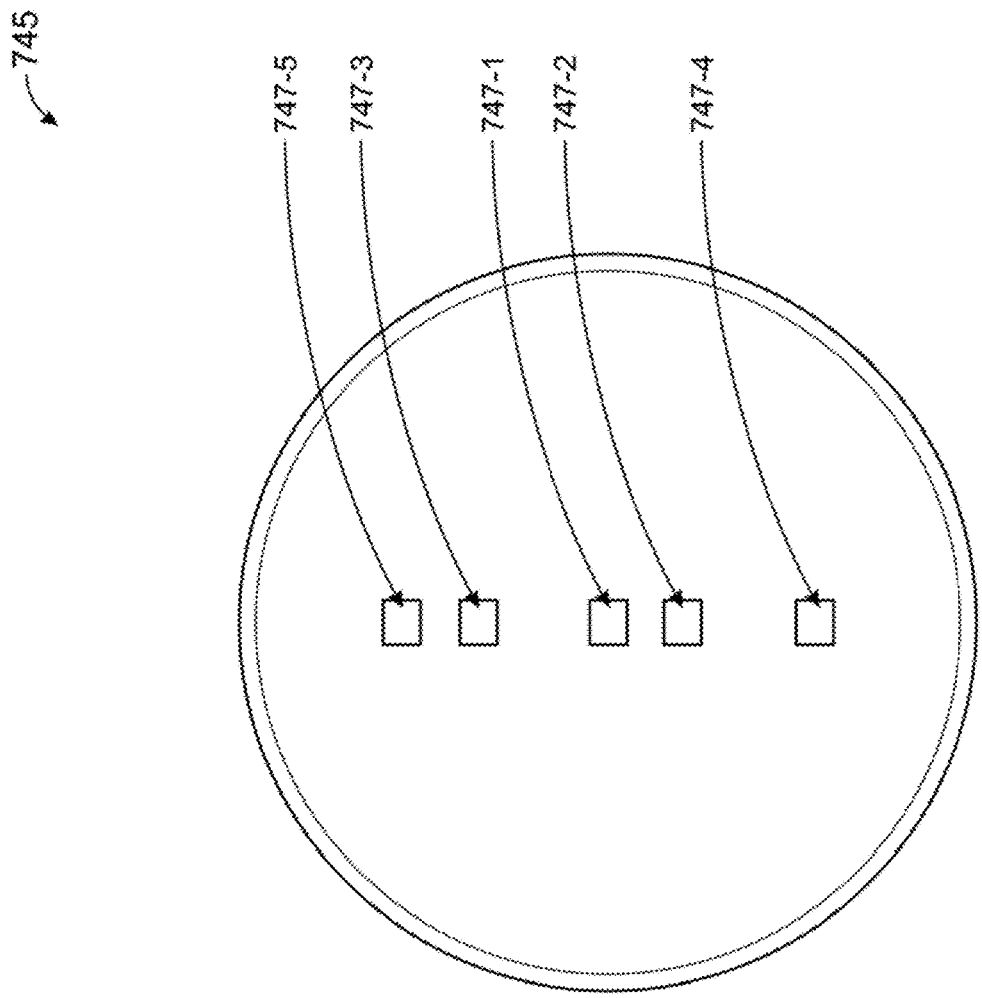

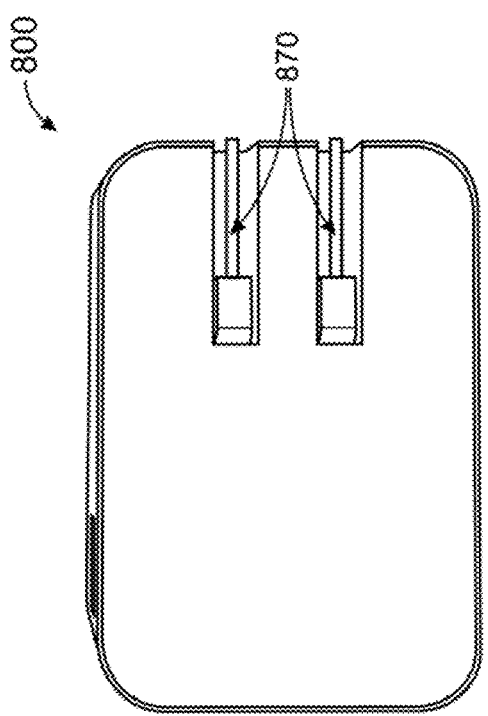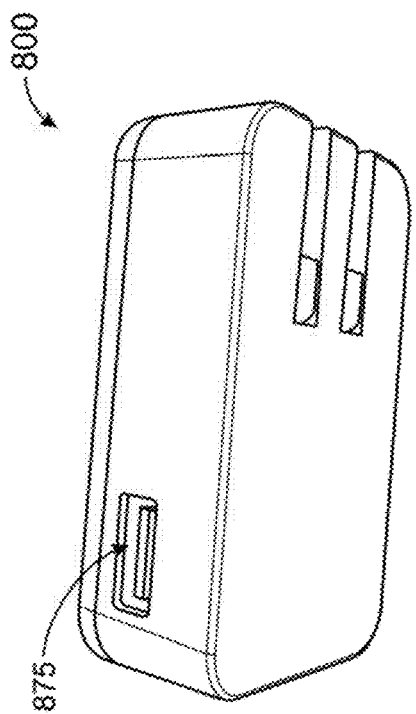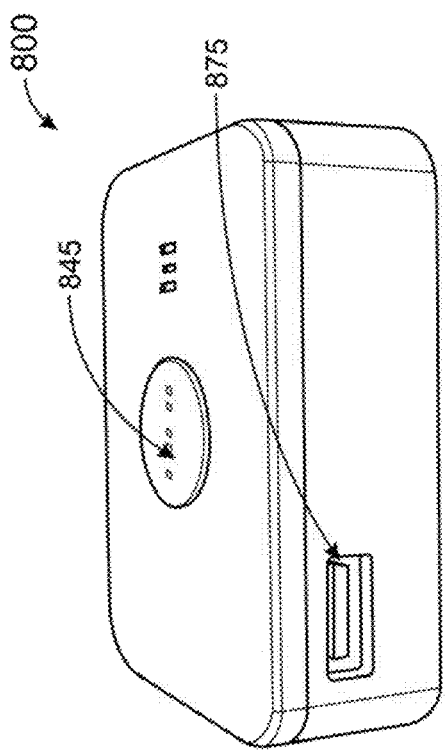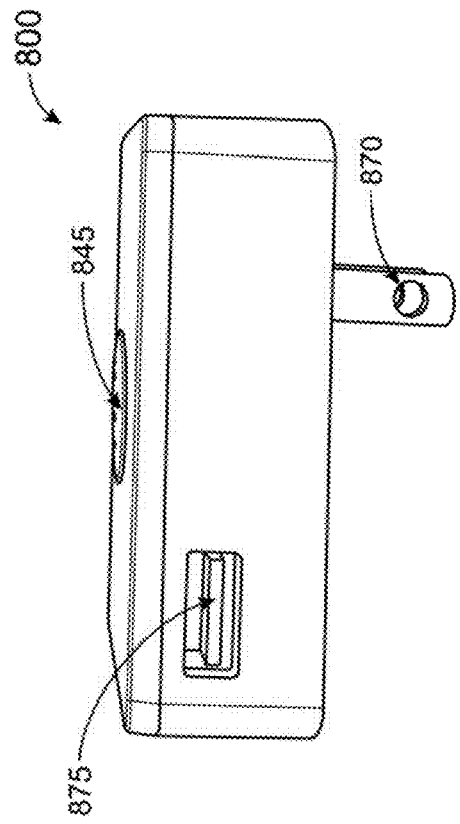
FIG. 8C
FIG. 8D
FIG. 8A
FIG. 8B

POWERED GARMENTS, PORTABLE DEVICES CONTROLLING POWERED GARMENTS, CHARGERS FOR POWERED GARMENTS, ENCLOSURES FOR STORING POWERED GARMENTS, AND INTERCONNECTIONS OF POWERED GARMENTS

CROSS-REFERENCE TO RELATED APPLICATION

This application is a continuation of U.S. patent application Ser. No. 16/703,038, entitled POWERED GARMENTS, PORTABLE DEVICES CONTROLLING POWERED GARMENTS, CHARGERS FOR POWERED GARMENTS, AND INTERCONNECTIONS OF POWERED GARMENTS, filed Dec. 4, 2019; which is a continuation of U.S. patent application Ser. No. 16/562,415, entitled POWERED GARMENTS, PORTABLE DEVICES CONTROLLING POWERED GARMENTS, CHARGERS FOR POWERED GARMENTS, AND INTERCONNECTIONS OF POWERED GARMENTS, filed Sep. 5, 2019; which is a continuation-in-part of and claims priority to U.S. patent application Ser. No. 16/552,889, entitled POWERED GARMENTS, PORTABLE DEVICES CONTROLLING POWERED GARMENTS. CHARGERS FOR POWERED GARMENTS, AND INTERCONNECTIONS OF POWERED GARMENTS, filed Aug. 27, 2019; which claims priority to U.S. Provisional Patent Application Ser. No. 62/858,261, entitled POWERED GARMENTS, PORTABLE DEVICES CONTROLLING POWERED GARMENTS, CHARGERS FOR POWERED GARMENTS, AND INTERCONNECTIONS OF POWERED GARMENTS, filed Jun. 6, 2019. Each of the above-referenced patent documents is hereby incorporated by reference in its entirety as if fully set forth herein, including Specification, Figures, Claims, and all other matter.

FIELD OF THE DISCLOSURE

This disclosure relates generally to electrically-powered garments; electrically-heated garments; electrically-heated garments with rechargeable power sources; chargers for electrically-powered garments; charging garment hangers; garments heated and cooled using fluids/gases; garments with integrated and attachable sensors; networked electrically-powered garments; interconnected groups and networks of electrically-powered garments and/or their rechargeable power sources; devices for powering, charging, configuring, and controlling such garments and groups/networks of garments and their rechargeable power sources; and methods for operating, configuring, and collecting data from such garments, groups of garments, and devices.

BACKGROUND

The textile and garment industries are undergoing a significant evolution. For much of the history of the textile industry, cotton, linen, leather, hemp, and silk have been the primary materials for garment production. In the early part of the last century, nylons and polyesters were added as staple textiles. As materials sciences evolve and weaving techniques improve, textiles are being developed that have unique desirable properties. Further, textiles and garments are being created that allow for sensor and other devices to be integrated into the textile or designed into the garment.

The performance of individuals quickly diminishes in environments that push body temperatures above or below about 98.6 degrees Fahrenheit. To enhance performance and comfort, a garment may be insulated to provide to the wearer protection against high and/or low temperatures. Insulation, however, may increase the dimensions and/or weight of the garments, and may inconvenience the wearer. A need in the art exists for garments that provide added protection against heat and/or cold, yet do not excessively inconvenience the wearer. To enhance the performance of individuals further, it would be useful to monitor physiological attributes and states of the individuals. A need in the art exists for garments that facilitate collection of biometric, environmental, and other information during use. With the integration of heating and cooling capabilities into a garment and with the increased use of garment biometric sensors, a need in the art exists for improving function control and configuration of powered garments by the wearer. Additionally, with the integration of these functional devices into a textile or garment, electrical power is necessary to support operations of these devices. For convenience, rechargeable battery technology may be used. Therefore, a need in the art exists for improving electrical recharging of garments with rechargeable power sources.

SUMMARY

This document describes embodiments, variants, implementations, and examples of novel techniques for addressing one or more of the needs identified above, and/or other needs. Selected embodiments described in this document include apparatus, methods, and articles of manufacture that facilitate recharging of garments with rechargeable cells, collecting of information from sensor-equipped garments, cooperation between and among two or more garments capable of electrical heating and/or collection of sensor information, and control and configuration of smart garments.

In an embodiment, a power cell recharging system is described.

In an embodiment, a hanger system includes a main body having a central portion, a first shoulder extender (support) protruding sideways from the central portion in a first direction, and a second shoulder extender protruding from the central portion in a second direction; a hanging attachment device attached to the main body to allow the hanger system to be hanged with the first shoulder extender and the second shoulder extender pointing in (directed towards) opposite horizontal directions; a hanger charging interface configured to couple to a garment charging interface of a powered garment and to recharge a rechargeable battery of the powered garment, the hanger charging interface includes: a hanger interface surface, a plurality of hanger contacts on the hanger interface surface, and a hanger magnet near the hanger interface surface, the hanger magnet having a first pole configured to attract the garment charging interface of the powered garment; and hanger circuitry configured to provide charging electric energy to at least two hanger contacts of the plurality of hanger contacts, for charging the rechargeable battery of the powered garment.

In aspects, the plurality of hanger contacts also includes one or more hanger contacts configured for data communication.

In aspects, the plurality of hanger contacts forms a universal serial bus (USB) interface.

In aspects, the hanger circuitry is also configured for the data communication.

In aspects, a the hanger system and the powered garment form a combination.

In aspects of the combination, the powered garment includes: an article of clothing, the rechargeable battery, garment circuitry, and a garment charging interface. The garment charging interface includes a garment interface surface, and a garment magnet with a second pole near the garment interface surface, the first pole and the second pole being opposite magnetic poles to attract each other. The garment charging interface also includes a plurality of garment contacts, the plurality of garment contacts including at least two charging contacts configured to receive charging electric energy. The garment magnet and the hanger magnet generate a magnetic force when the garment interface surface and the hanger interface surface are near each other, the magnetic force tending to bring the garment interface surface and the hanger interface surface into contact with each other so that the contacts of the plurality of hanger contacts and the contacts of the plurality of garment contacts touch each other and enable transfer of the charging electric energy from the at least two hanger contact to the at least two garment contacts.

In aspects, the garment circuitry is configured to receive the charging electric energy from the at least two hanger contacts through the at least two garment contacts and charge the rechargeable battery using the charging electric energy.

In aspects, the plurality of garment contacts also includes one or more garment contacts configured for the data communication, and the garment circuitry is also configured for the data communication. When the garment interface surface and the hanger interface surface are brought into contact with each other by, e.g., the magnetic force, the one or more hanger contacts configured for the data communication and the one or more garment contacts configured for the data communication come into contact to enable the data communication between the hanger circuitry and the garment circuitry.

In aspects, each contact of the plurality of hanger contacts is a circular disc or a ring, all contacts of the plurality of hanger contacts are concentric, and the first pole of the hanger magnet is disposed at the center of the plurality of hanger contacts.

In aspects, each contact of the plurality of garment contacts is a smaller contact, and the second pole of the garment magnet is disposed substantially at the center of the plurality of garment contacts.

In aspects, each contact of the plurality of garment contacts is a circular disc or a ring, all contacts of the plurality of garment contacts are concentric, and the second pole of the garment magnet is disposed at the center of the plurality of garment contacts.

In aspects, each contact of the plurality of hanger contacts is a smaller contact, and the first pole of the hanger magnet is disposed substantially at the center of the plurality of hanger contacts.

In aspects, the powered garment includes a clothing label and the garment interface surface is disposed on or under the label.

In aspects, the hanger interface surface is on a first side of the hanger system, the hanger system also includes a second charging interface means for charging on a second side of the hanger system, the second side being opposite the first side.

In aspects, the hanger interface surface is on a first side of the hanger system, the hanger system also includes a second charging interface means for contact charging on a second side of the hanger system, the second side being opposite the first side.

In aspects, the hanger interface surface is on a first side of the hanger system, the hanger system also includes a second charging interface means for inductive charging on a second side of the hanger system, the second side being opposite the first side.

The first and second sides may be parallel to each other.

In an embodiment, a hanger system includes a main body having a central portion, a first shoulder extender protruding sideways from the central portion in a first direction, and a second shoulder extender protruding from the central portion in a second direction, the main body forming a first surface and a second surface; a hanging attachment device attached to the main body to allow the hanger system to be hanged with the first shoulder extender and the second shoulder extender pointing in opposite horizontal directions; a first hanger charging interface attached to the main body and configured to couple to a garment charging interface of a powered garment and to recharge a rechargeable battery of the powered garment. The first hanger charging interface includes a sending coil disposed near the first surface to couple inductively to a receiving coil of the garment charging interface when the powered garment is hanged on the hanger system, and a hanger magnet having a first pole configured to attract the garment charging interface of the powered garment. The hanger system also includes hanger circuitry configured to drive the sending coil with alternating current to couple inductively to the receiving coil at a frequency that limits radiation from the sending coil, thereby providing charging electric energy for charging the rechargeable battery of the powered garment.

In aspects, the frequency is equal to or less than 100 KHz.
In aspects, the frequency is equal to or less than 10 KHz.
In aspects, the frequency is equal to or less than 1 KHz.
In aspects, the frequency is electric power grid frequency of 50 Hz or 60 Hz.

In aspects, the sending coil is disposed inside the main body, the sending coil has a first sending coil end and a second sending coil end, the first sending coil end being disposed near the first surface and the second sending coil end being disposed near the second surface, and the sending coil is configured to transfer the charging electric energy from the first surface, from the second surface, and/or from both the first and second surfaces.

In aspects, the frequency is 50 Hz or 60 Hz, and the hanger circuitry includes a transformer to convert household voltage to a lower voltage that is used to provide the alternating current to drive the sending coil.

In aspects, a combination includes the hanger system and the powered garment.

In aspects of the combination, the powered garment includes means for charging the rechargeable battery of the powered garment using the charging electric energy from the receiving coil.

In an embodiment, a garment system includes an electrical power source; a controller system; a memory; a wireless communication system; at least one biometric sensor and/or a heating panel; an electrical contact associated with a magnet, the magnet providing a coupling means for a charging system, and having a plurality of contact points for providing electric charging and/or data transfer.

In an embodiment, a clothes storage system includes a garment enclosure designed to receive and store a garment and substantially enclose the garment when the garment is inserted into the garment enclosure. The clothes storage system also includes an induction exciter configured to excite electromagnetic induction inside the garment enclosure when the induction exciter is driven by a time-varying electrical drive. The clothes storage system additionally includes induction exciting circuitry configured to provide the time-varying electrical drive to the induction exciter. The clothes storage system further includes an enclosure-garment data interface configured to establish short range wireless communication links.

In aspects, the time-varying electrical drive provided by the induction exciting circuitry is alternating (AC) electrical drive.

In aspects, the frequency of the AC electrical drive is 50 Hz or 60 Hz.

In aspects, the frequency of the AC electrical drive is under 10 KHz.

In aspects, the frequency of the AC electrical drive is under 100 KHz.

In aspects, the enclosure-garment data interface includes a Bluetooth® transceiver.

In aspects, the enclosure-garment data interface includes a wireless radio frequency transceiver configured to establish wireless communication links using transmit power of 1 mW or less.

In aspects, the enclosure-garment data interface includes a wireless radio frequency transceiver configured to establish wireless communication links using transmit power of 10 mW or less.

In aspects, the enclosure-garment data interface includes a wireless radio frequency transceiver configured to establish wireless communication links using transmit power of 100 mW or less.

In aspects, the garment enclosure is or includes a garment bag, which may be a travel bag.

In aspects, the clothes storage system also includes a battery, and the induction exciting circuitry includes a DC-to-AC converter configured to receive electrical energy from the battery and convert the electrical energy from the battery into the time-varying electrical drive provided to the induction exciter.

In aspects, the induction exciting circuitry is configured to receive 50 Hz or 60 Hz outlet electricity and convert the outlet electricity into the electrical drive for the induction exciter.

In aspects, the garment enclosure is a walled closet, for example, in a dwelling room, a working room such as an office, or another place of a building's interior.

In aspects, the induction exciter includes one or more enclosure coils.

In aspects, the clothes storage system also includes a WAN interface to a wide area network, thereby allowing the enclosure-garment data interface to be connected to the wide area network through the WAN interface. The WAN interface is selected from the group consisting of a WiFi interface, a cellular interface, and an Ethernet interface.

In aspects, a combination includes the clothes storage system and a garment. The garment includes a garment battery, an induction receiver, and a battery charger coupled to the garment battery and to the induction receiver, the battery charger being configured to receive induced electrical energy that is induced in the induction receiver by the induction exciter, to convert the induced electrical energy into DC electrical energy suitable for charging the garment battery, and to charge the garment battery using the DC electrical energy.

In aspects of the combination, the garment also includes a garment processing module and a wireless garment data interface configured to establish a wireless communication link with the enclosure-garment data interface, whereby the garment processing module is enabled to send data to and receive data from external computing devices coupled to the wide area network, through the garment data interface, the enclosure-garment data interface, and the WAN interface.

In aspects, the garment data interface includes a garment Bluetooth® transceiver, the enclosure-garment data interface includes an enclosure Bluetooth® transceiver, and the WAN interface includes a WiFi transceiver coupled to a modem that connects to the Internet.

In aspects, the garment also includes one or more sensors selected from the group consisting of biometric sensors and environmental sensors, and the garment processing module is coupled to the one or more sensors to configure the one or more sensors for operation and/or for collecting sensor data from the one or more sensors.

In aspects, the garment wireless data interface is also configured to communicate with a wireless data interface of an additional garment.

In aspects, the garment also includes a garment-to-garment interface configured to communicate with a data interface of an additional garment. The garment-to-garment interface may be a wired and/or wireless interface.

In an embodiment, a clothes storage system includes a garment holder designed to receive and store at least one garment, an electromagnetic radiator attached to the garment holder, power circuitry configured to provide electrical drive to the electromagnetic radiator to cause the electromagnetic radiator to radiate radio frequency (RF) power for conversion to IX charging power used to recharge batteries of powered garments, and a holder-garment data interface configured to establish short range wireless communication links.

In aspects, the garment holder includes a garment hanger with a hook and a pair of garment support sections.

In aspects, the garment holder is a garment bag, such as a carrying/travel garment bag.

In aspects, a combination includes the clothes storage system, and a powered garment. The powered garment includes a battery, an electromagnetic radiation receiver, and a battery charger coupled to the battery and to the electromagnetic radiation receiver. The battery charger is configured to receive the RF power radiated by the electromagnetic radiator of the clothes storage system and received by the electromagnetic radiation receiver of the powered garment, to convert the RF power into DC electrical power suitable for charging the battery, and to charge the battery using the DC electrical power.

In an embodiment, a powered garment includes a battery, one or more electrical energy-consuming components powered by the battery, an electromagnetic radiation receiver, and a battery charger coupled to the battery and to the electromagnetic radiation receiver. The battery charger is configured to obtain electrical energy generated by radio frequency (RF) radiation in the electromagnetic radiation receiver, to convert the electrical energy into IX electrical energy suitable for charging the battery, and to charge the battery using the DC electrical energy, whereby the battery is recharged using the RF radiation.

In aspects, the one or more electrical energy-consuming components of the powered garment include a heating element.

In aspects, the one or more electrical energy-consuming components of the powered garment include a processing module, a radio frequency transceiver, and one or more biometric and/or environmental sensors.

In an embodiment, a smart garment includes an article of clothing or footwear. The smart garment also includes a first processing module. The smart garment additionally includes a first memory coupled to the first processing module; the first memory stores first instructions executable by the first processing module. The smart garment further includes one or more first sensors, each sensor of the one or more first sensors selected from the group consisting of biometric sensors and environmental sensors. Each sensor of the one or more first sensors is coupled to the first processing module and is configurable and readable by the first processing module. The smart garment further includes a first short range radio frequency (RF) transceiver coupled to the first processing module. When the first processing module executes the first instructions, the first processing module configures the smart garment to: establish a first RF communication link with a communication device, thereby enabling the first processing module to receive from the communication device first configuration information for the one or more first sensors; configure the one or more first sensors in accordance with the first configuration information; collect first sensor data from the one or more first sensors; and transmit the first sensor data over the first RF communication link from the smart garment to the communication device.

In aspects, the first short range RF transceiver is or includes a WiFi transceiver, a cellular transceiver, and/or a Bluetooth® transceiver.

In aspects, the transmit power of the first short range RF transceiver does not exceed 10 mW.

In aspects, the transmit power of the first short range RF transceiver does not exceed 100 mW.

In aspects, the one or more first sensors include at least two sensors selected from the group consisting of a Global Positioning System (GPS) sensor, an external temperature sensor, a body temperature sensor, an accelerometer, an atmospheric pressure sensor, a heart rate sensor, a blood oxygenation sensor, a blood glucose sensor, an ionizing radiation sensor, a non-ionizing radiation sensor, a light sensor, a movement sensor, a gas sensor, a smoke sensor, a dust sensor, a camera, and a microphone.

In aspects, a combination includes the smart garment and the communication device. The communication device includes a communication device processor, communication device memory coupled to the communication device processor and storing an app with instructions, and a short range RF communication device transceiver coupled to the communication device processor. The communication device transceiver is compatible with the first short range RF transceiver of the smart garment, and the first RF communication link is between the first short range RF transceiver of the smart garment and the short range RF communication device transceiver. When the communication device processor executes the instructions of the app, the communication device processor configures the communication device to transmit the first configuration information over the first RF communication link to the smart garment, and to receive the first sensor data over the first RF communication link from the smart garment.

In aspects, the communication device is or includes a smartphone, a tablet, a portable computer.

In aspects, the communication device also includes a cellular transceiver.

In aspects, the communication device also includes a WiFi transceiver coupled to a modem that connects to the Internet.

In aspects, the communication device is built into a garment hanger.

In aspects, the communication device is built into a garment bag.

In aspects, the communication device also includes a second RF transceiver that provides a link to the Internet.

In aspects, when the communication device processor executes the instructions of the app, the communication device processor further configures the communication device to send the first sensor data to a remote server via the link to the Internet.

In aspects, when the communication device processor executes the instructions of the app, the communication device processor further configures the communication device to transmit the first configuration information to the smart garment over the first RF communication link.

In aspects, when the communication device processor executes the instructions of the app, the communication device processor further configures the communication device to receive the first configuration data over the link to the Internet.

In aspects, the smart garment also includes a temperature varying element having a power off setting and one or more power on settings, and the communication device also includes a user interface. The settings of the temperature varying element are controllable by the first processing module. When the communication device processor executes the instructions of the app, the communication device processor further configures the communication device to receive through the user interface setting selections for the temperature varying element, and to transmit the setting selections via the first RF communication link to the smart garment. And when the first processing module executes the first instructions, the first processing module configures the temperature varying element to operate on settings corresponding to the setting selections. In this way the user of the combination (such as a wearer of the smart garment) is enabled to control temperature settings of the garment.

In aspects, the temperature varying element is or includes one or more heating elements and/or one or more cooling elements.

In aspects, the temperature varying element is or includes a thermal control element.

In aspects, an apparatus includes the combination and a slave garment. The slave garment includes one or more configurable slave device elements and a slave-master data interface to the smart garment. When the first processing module executes the first instructions, the first processing module further configures the smart garment to send slave configuration information to the slave garment through the slave-master data interface, thereby causing one or more configurable slave device elements to be configured in accordance with the slave configuration information.

In aspects, the slave data interface is or includes a wireless interface and/or a wired interface.

In aspects, the one or more configurable slave device elements include a heating element.

In aspects, the one or more configurable slave device elements include a first slave sensor, which may be a biometric sensors or an environmental sensor.

In aspects, the smart garment also includes a second short range RF transceiver; the slave-master data interface includes a slave garment short range RF transceiver compatible with the second short range RF transceiver of the smart garment; and, when the first processing module executes the first instructions, the first processing module further configures the smart garment to establish a second RF communication link between the second short range RF transceiver of the smart garment and the slave garment short range RF transceiver, and to transmit the slave configuration information to the slave garment over the second RF communication link.

In aspects, the slave-master data interface includes a slave garment short range RF transceiver compatible with the first short range RF transceiver of the smart garment. When the first processing module executes the first instructions, the first processing module further configures the smart garment to establish a second RF communication link between the first short range RF transceiver of the smart garment and the slave garment short range RF transceiver.

In aspects, when the communication device processor executes the instructions of the app, the communication device processor configures the communication device to transmit the slave configuration information over the first RF communication link to the smart garment.

In aspects, the slave garment includes a slave device processing module and a slave device memory coupled to the slave device processing module and storing slave device instructions executable by the slave device processing module. The slave device processing module is coupled to the first slave sensor to configure the first slave sensor and read the first slave sensor. When the slave device processing module executes the slave device instructions, the slave device processor configures the slave garment to collect slave sensor data from the first slave sensor and transmit the slave sensor data over the second RF communication link to the smart garment.

In aspects of the apparatus, when the first processing module executes the first instructions, the first processing module further configures the smart garment to receive the slave sensor data from the slave garment and to transmit the slave sensor data over the first RF communication link to the communication device.

In aspects of the apparatus, the communication device further includes a second RF transceiver that provides a link to the Internet. When the communication device processor executes the instructions of the app, the communication device processor further configures the communication device to transmit the first sensor data and the second sensor data to a remote server via the link to the Internet.

Various features and aspects will be better understood with reference to the following description, drawings, and appended claims.

BRIEF DESCRIPTION OF THE FIGURES

FIGS. 6A, 6B, 6C, 6D, 6E, 6F, 6G, 6H, and 6I illustrate selected components of a foldable/portable hanger with magnetic charging interfaces facing in opposite directions, in accordance with selected aspects described in this document;

FIGS. 7A and 7B illustrate selected components of magnetically coupled mechanical charging interfaces, in accordance with selected aspects described in this document;

FIGS. 8A, 8B, 8C, and 8D illustrate components of a charger with a magnetically coupled mechanical charging interface, in accordance with selected aspects described in this document;

DETAILED DESCRIPTION

Figure 1:
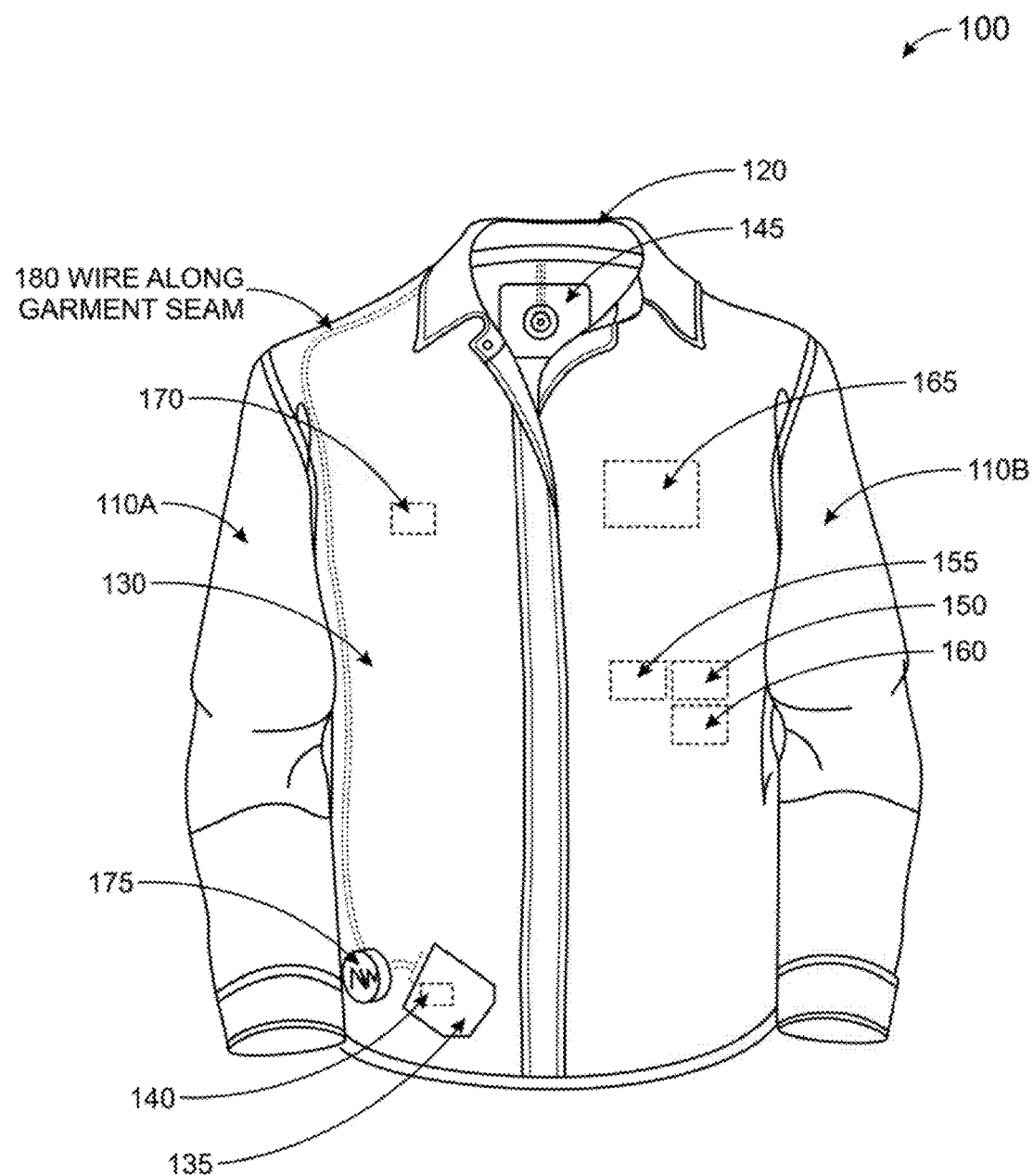
FIG. 1 illustrates selected components of a powered garment in accordance with selected aspects described in this document.

The words "embodiment," "variant," "example," "implementation," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases may be used to indicate one of a number of different possible embodiments, variants, examples, or implementations. The number of possible embodiments, variants, examples or implementations is not necessarily limited to two or any other quantity. Characterization of an item as "exemplary" means that the item is used as an example. Such characterization does not necessarily mean that the embodiment, variant, example, or implementation is a preferred one; the embodiment, variant, example, or implementation may but need not be a currently preferred embodiment, variant, example, or implementation. All embodiments, variants, examples, and implementations are described for illustration purposes and are not necessarily strictly limiting.

The words "couple," "connect," and similar words/expressions/phrases with their inflectional morphemes, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not met.

"Footwear" means outer wearing apparel worn on feet, such as shoes and boots.

A "garment" means an article of clothing, including a textile article of clothing and an article of clothing made of another material. A "garment" also signifies a piece or pair of "footwear." References to "non-footwear garment" mean a "garment" that is not footwear. Non-exclusive examples of "garments" include: jackets; coats; pants; shirts; vests; socks, stockings, long johns, and, more generally, underwear; gloves; shoes, sneakers, boots, and, more generally, footwear; skirts and kilts; hoodies; leggings; hats/helmets, and, more generally, headgear. Garments may be designed for animals, for example, for dogs and other pets. Garments may be used for recreational and sport activities, such as motorcycling and skiing/other winter sports; work, such as work outside of controlled environments and work in temperature controlled areas such as refrigerators; and conventional everyday activities.

Some definitions have been explicitly provided above. Other and further explicit and implicit definitions and clarifications of definitions may be found throughout this document.

FIG. 1 illustrates selected components of a powered garment 100. The garment 100 may be a jacket having sleeves 10A and 110B, a neck or collar 120, and a main body 130. A pocket 135 is on a side of the main body 130, and generally may be located anywhere on the jacket 100, inside or outside. Also shown schematically are several electrical and/or electronic components, which may be located inside and possibly sewn or otherwise placed and attached between different layers/lining of the jacket 100, and therefore might not be visible from the outside and possibly also from the inside. It is contemplated that the electronic components may be integrated as part of the weave of the textile of the garment. Of course, some or all of them might be visible from the inside and/or from the outside. The electrical/electronic components may include a battery 140 (shown inside the pocket 135), a garment charging interface 145, a wireless transceiver 150, a controller 155, a regulator 160, one or more heating or cooling elements 165 (of which only one is shown in the Figure), one or more sensors 170, visible, audible or haptic indicators (not shown in the Figures), and a control button 175. The electrical/electronic components may be interconnected by wiring; one wire 180 running along a garment seam is partially shown in FIG. 1. In embodiments, some or all of the wiring may be routed along seams of the jacket 100.

Although the electrical/electronic components of the jacket (or another garment) 100 are schematically shown as separate devices, some or all of them may be combined. Thus, in examples, all of the components are combined in the enclosure of the battery 140. In examples, the control button is a separate component, and all or at least one other components are combined with the battery. More generally, any two or more of the components may be combined.

Figure 2:
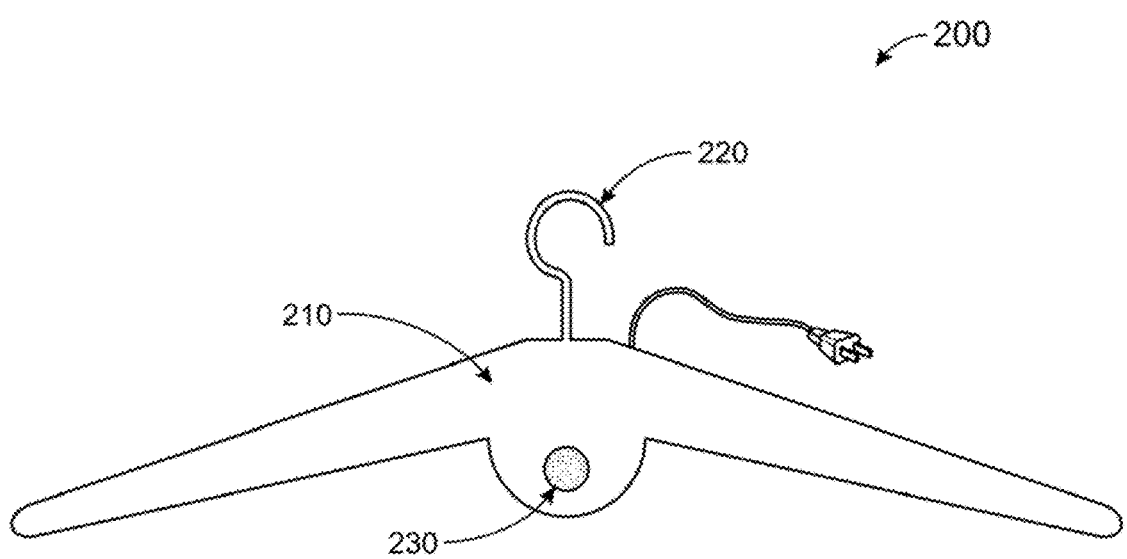
FIG. 2 illustrates selected components of a charging clothing hanger, in accordance with selected aspects described in this document.

FIG. 2 illustrates selected components of a charging clothing hanger 200 designed to receive the jacket 100. The hanger 200 includes a body 210, a hanging hook 220, a hanger charging interface 230, and electrical/electronic components for charging and/or interfacing with the jacket 100. Here as well all or any two or more of the components of the hanger 200 may be combined.

The battery 140 may be a rechargeable battery, for example, a Nickel Cadmium (NiCad) battery, a Nickel Metal Hydride (NiMH) battery, a Lithium Ion (Li-Ion) battery, a Lithium-Polymer (LiPo) battery, or any other electrical energy storage device, including capacitors and supercapacitors. Note that the battery 140 may have one or several cells, connected in series, in parallel, or otherwise. The battery 140 may be placed, for example, in the pocket 135, either directly or into a sub-pocket (inside the pocket 135) designed to receive the battery 140. The battery 140 may be connected and provide power to one or more of the other electrical/electronic components of the jacket 100 that need power to operate, such as the heating element(s) 165, the wireless transceiver 150, the controller 155, the sensor(s) 170, the control button 175, and possibly others. The battery 140 is also connected to the garment charging interface 145 and/or the regulator 160, to receive electrical power through these components and recharge.

The garment charging interface 145 is designed to couple to the hanger charging interface 230 of the hanger 200. In embodiments, the two charging interfaces are designed to couple electrical energy via electrical induction. Thus, the hanger charging interface 230 may include a sending coil driven with an alternating frequency, and the garment charging interface may include a receiving coil. When the two coils are substantially parallel and/or near each other, they couple inductively, and electrical energy can be transferred from the hanger charging interface 230 to the garment charging interface 145 by driving the sending coil of the interface with alternating current (AC). Thus, the locations of the two charging interfaces may be such that when the jacket 100 is hanged on the hanger 200, the two charging interfaces are near each other to allow the inductive transfer of energy from the hanger charging interface 230 to the garment charging interface 145. Inductive transfer of energy can be effected using AC at 50 Hz or 60 Hz, for example. More generally, inductive coupling between the two charging interfaces may be effected at lower or higher frequencies. In examples, the inductive coupling is such that less than ten percent of the energy available to the hanger charging interface 230 for sending to the garment charging interface 145 is radiated by the hanger charging interface 230. In examples, the operating frequency is below 100 KHz; in more specific examples, the operating frequency is below 10 KHz; in still more specific examples, the operating frequency is 1 KHz or less. In examples, each of the interfaces 145/230 is a coil, with a magnetic core to enhance the inductive coupling between the interfaces 145/230, such as 50-60 Hz transformer cores, including laminated and non-laminated metal cores. In examples, the magnetic cores may be formed so that one fits (approximately) in the other; for instance, the hanger's core may form a cylindrical or conical opening (with the broad part of the conical opening facing towards the garment), and the garment's core may form a conus fitting into the hanger's conical opening, or a cylinder fitting inside the hanger's cylindrical opening. In examples, however, one or both of the interfaces 145/230 do not include transformer-like cores.

In embodiments, the alignment of (and therefore mutual coupling between) the interfaces 145230 is improved by inclusion of magnets in each of the interfaces. The magnets may be oriented so that when the jacket 100 is hanged on the hanger 200, the two magnets attract the interfaces 145/230 to each other, and therefore bring them into closer proximity; for example, the interfaces 145/230 may come into contact with each other under the force of the magnetic attraction between the opposite poles of their respective magnets. In examples, however, only one of the interfaces 145 or 230 includes a magnet, while the other interface includes a magnetic member that is attracted to magnets, and specifically to the magnet of the first interface. The interface 145 may include a magnet, while the interface 230 may include the magnetic member that, while not necessarily a magnet itself, is attracted to the magnet of the interface 145. Analogously, the interface 230 may include a magnet, while the interface 145 may include such magnetic member. In examples, the magnetic member is not a separate element, but the inductive core of the interface in which it is incorporated (the interface 145 or the interface 230, as the case may be). Thus, such a magnetic member may serve two related functions: help bring the two interfaces 145/230 nearer each other, and improve the inductive coupling between the two interfaces 145/230 by improving the transformer-like properties of the combination of the sending and receiving coils of these interfaces.

The detailed description of inductive coupling should not be understood as excluding electromagnetic coupling using higher frequencies, for example, RF frequencies. Thus, in embodiments, the hanger charging interface includes an RF radiator antenna driven by appropriately designed/configured power circuitry of the hanger at radio frequency, and the garment charging interface may include an RF radiation receiver antenna coupled to appropriate circuitry (e.g., of the regulator 160) for converting the energy of the received RF emissions into the electrical energy suitable for recharging the battery of the garment.

The interfaces 145/230 may include contacts to allow charging current to flow from the interface 230 into the interface 145, and the magnets may couple the interfaces 145/230 so that the contacts couple with the right polarity, plus-to-plus, minus-to-minus. The polarity of the contacts may be controlled with the polarity/orientation of the magnets in the respective interfaces 145/230; in other words, the polarity of the magnets may be such that the contacts couple correctly when the interfaces 145/230 come together under the forces generated by their respective magnets, North-to-South and South-to-North. In other embodiments, the physical shapes of the interfaces 145 and 230 include protrusions and openings/indentations that come together one way to assure that the contacts couple correctly and prevent the opposite (incorrect) coupling of the contacts. As will be discussed in more detail below in relation to FIGS. 7A and 7B, there may be additional contacts on the interfaces 145/230, to allow flow of signals. The contacts of the interfaces 145/230 may touch each other without manual involvement beyond hanging of the garment on the hanger; this will also be discussed in more detail below. An advantage of such mechanical (non-inductive) coupling arrangement may be that there is no need to provide alternating current drive to the interface 230 or to rectify the received AC on the side of the interface 145, simplifying the electrical/electronic components of the interfaces 145/230 and likely improving the efficiency of the energy transfer from the hanger 200 to the jacket 100.

Figure 3:
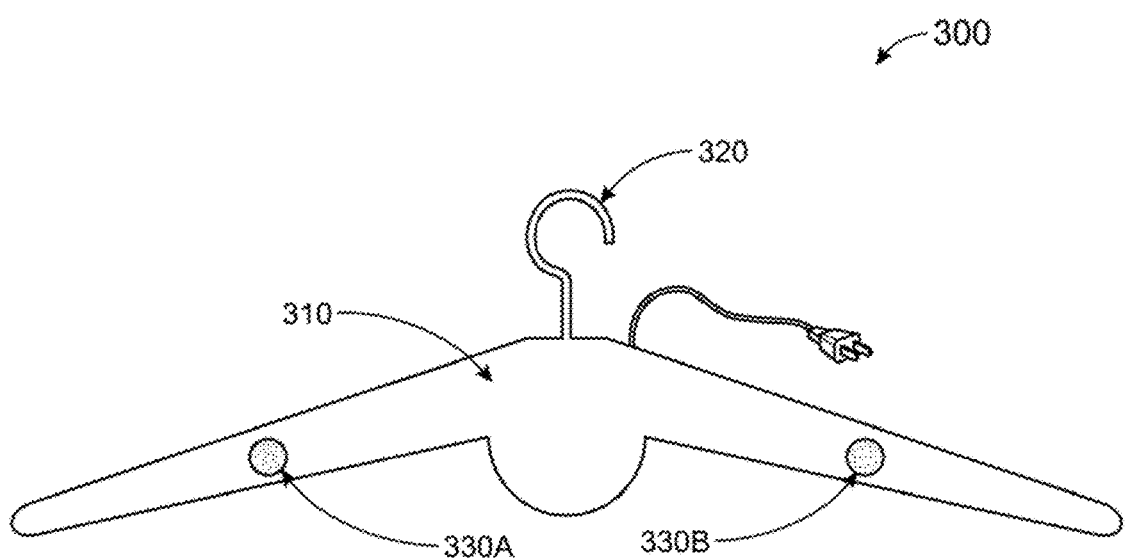
FIGS. 3, 4, and 5 illustrate selected components of charging clothing hangers having multiple charging interfaces, in accordance with selected aspects described in this document.
Figure 4:
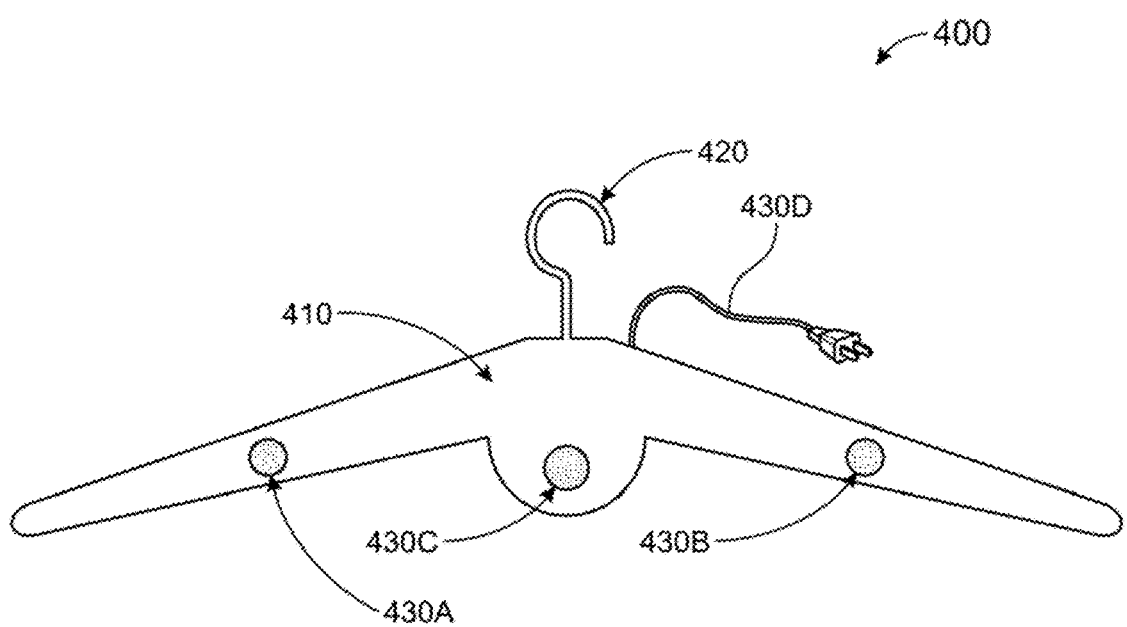
Figure 5:
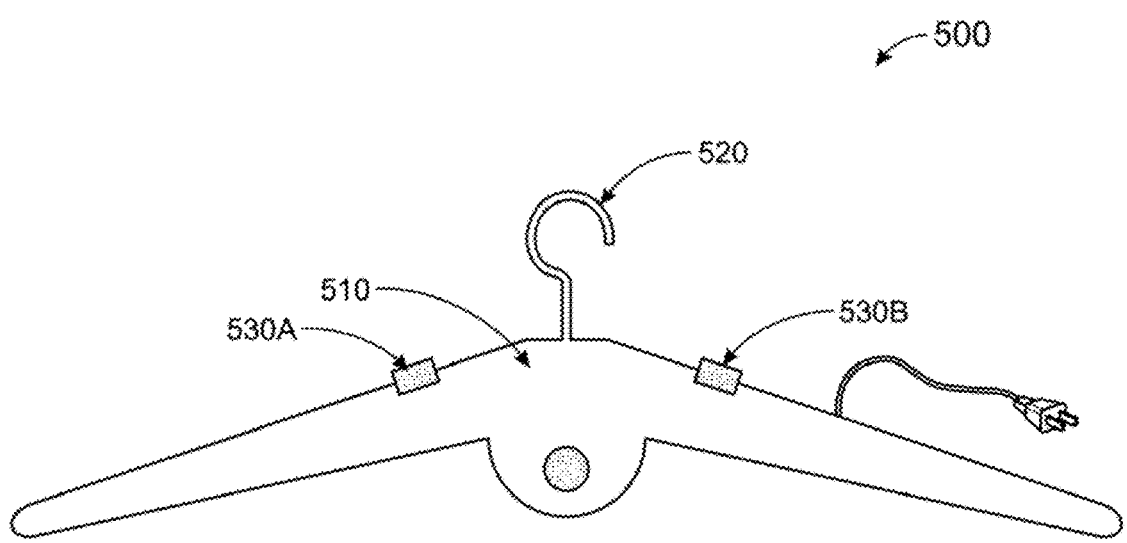
Figure 6B:
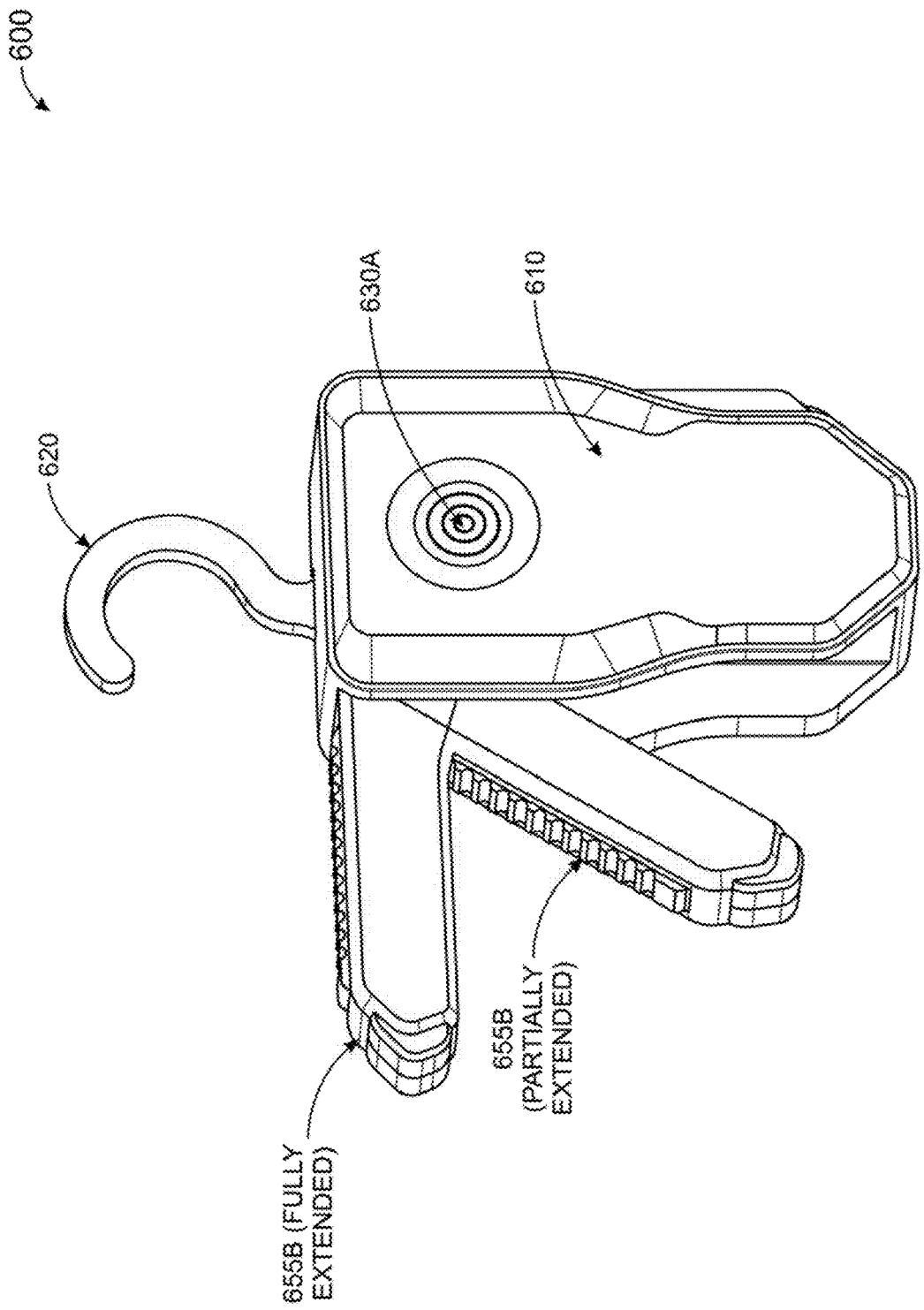
Figure 6C:
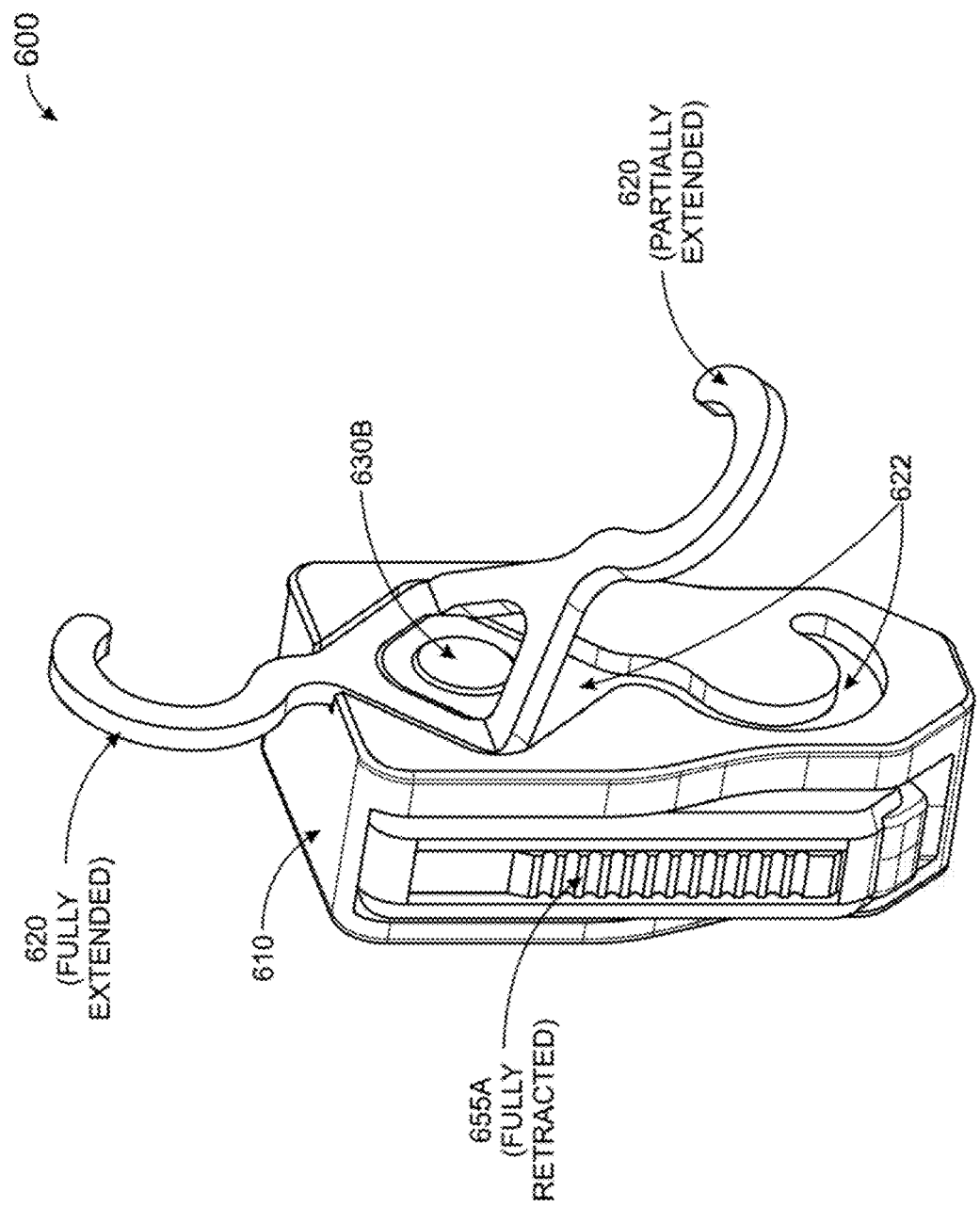
Figure 6D:
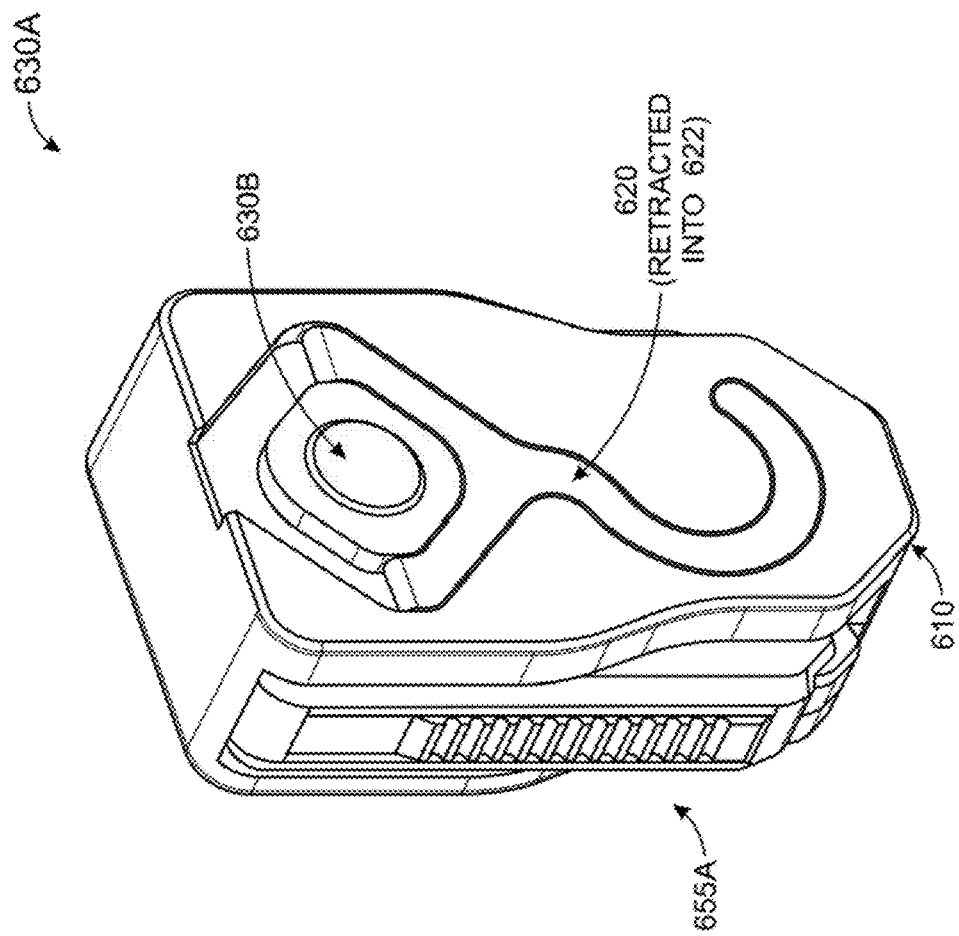
Figure 6E:
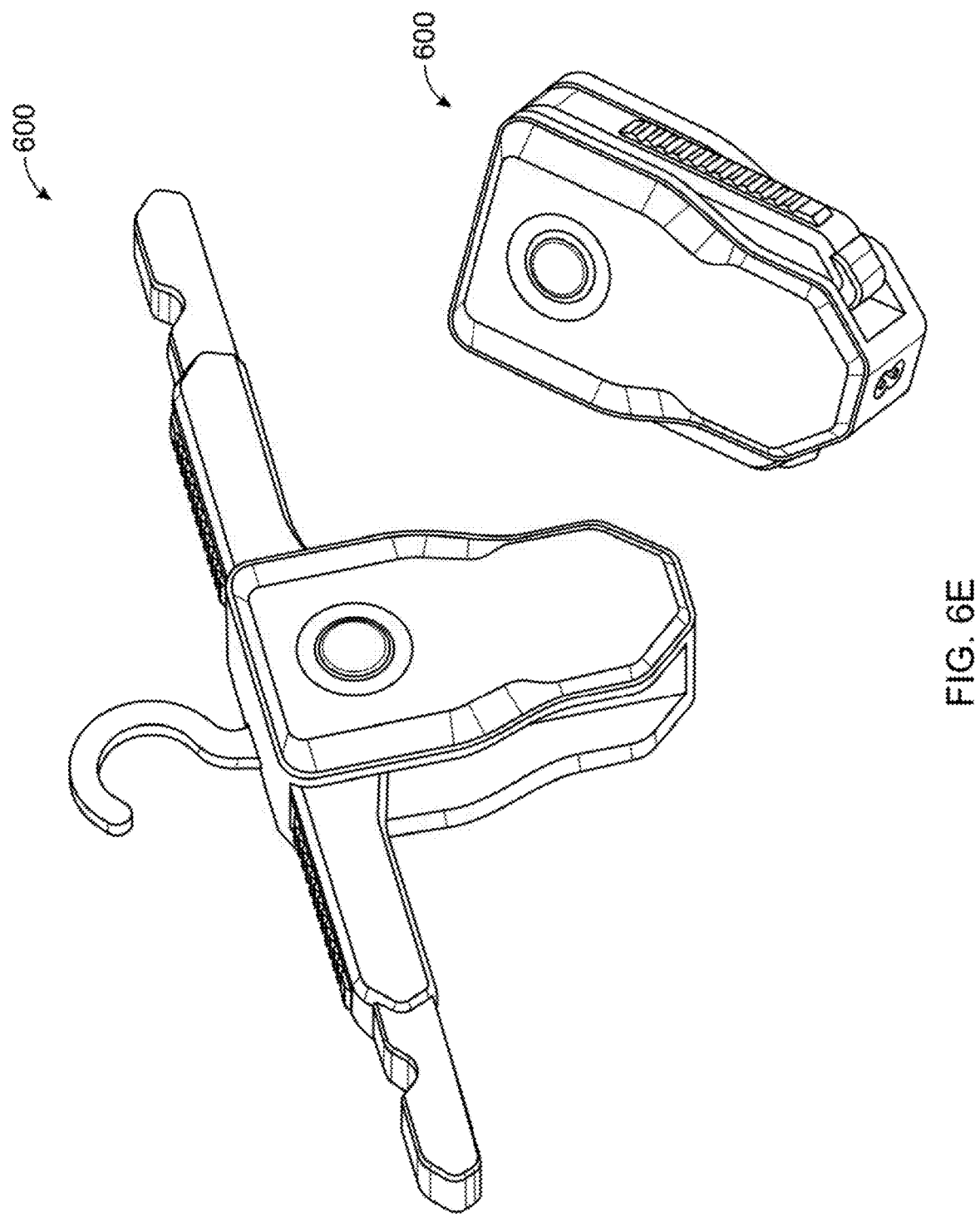
Figure 6F:
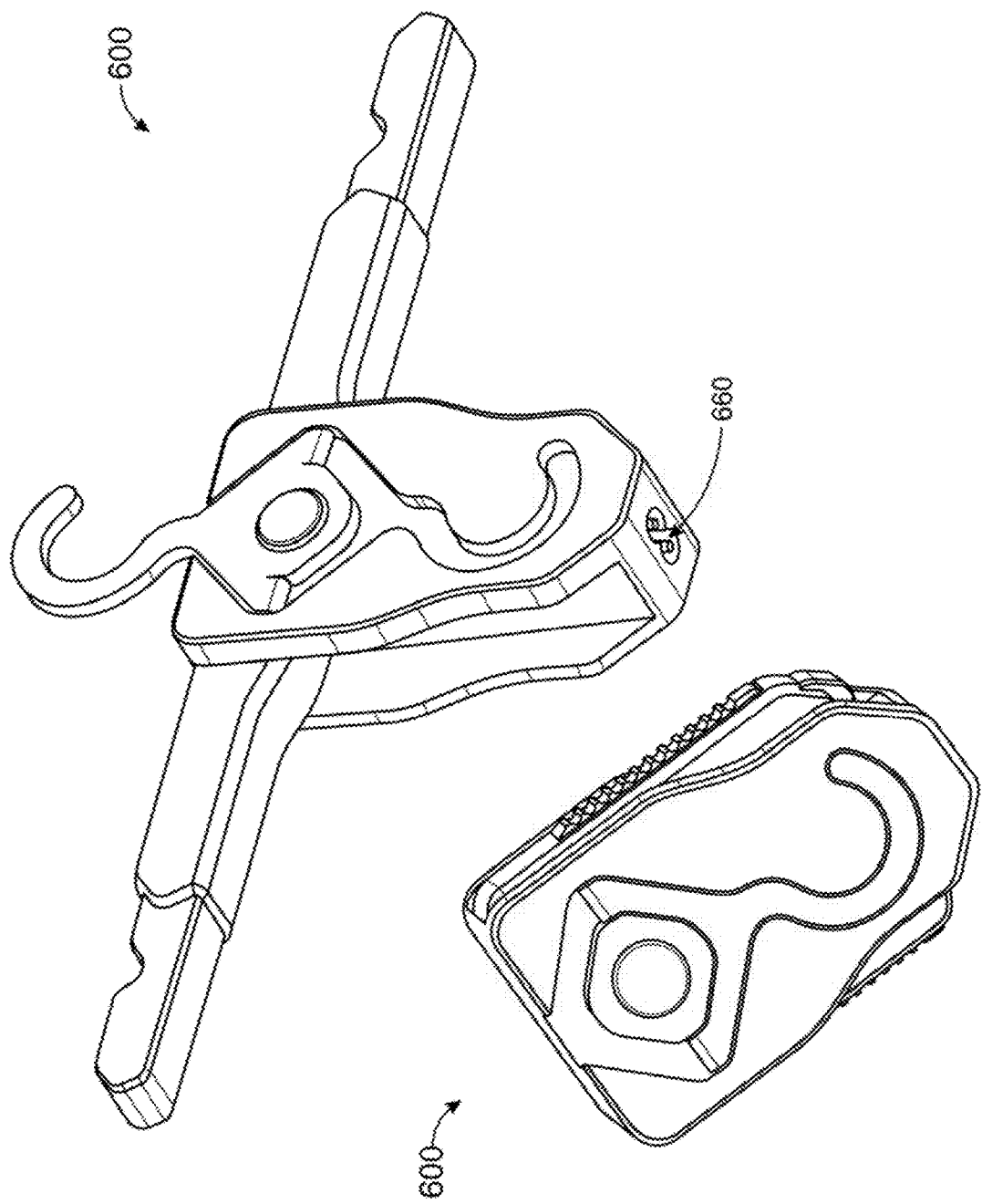
Figure 6G:
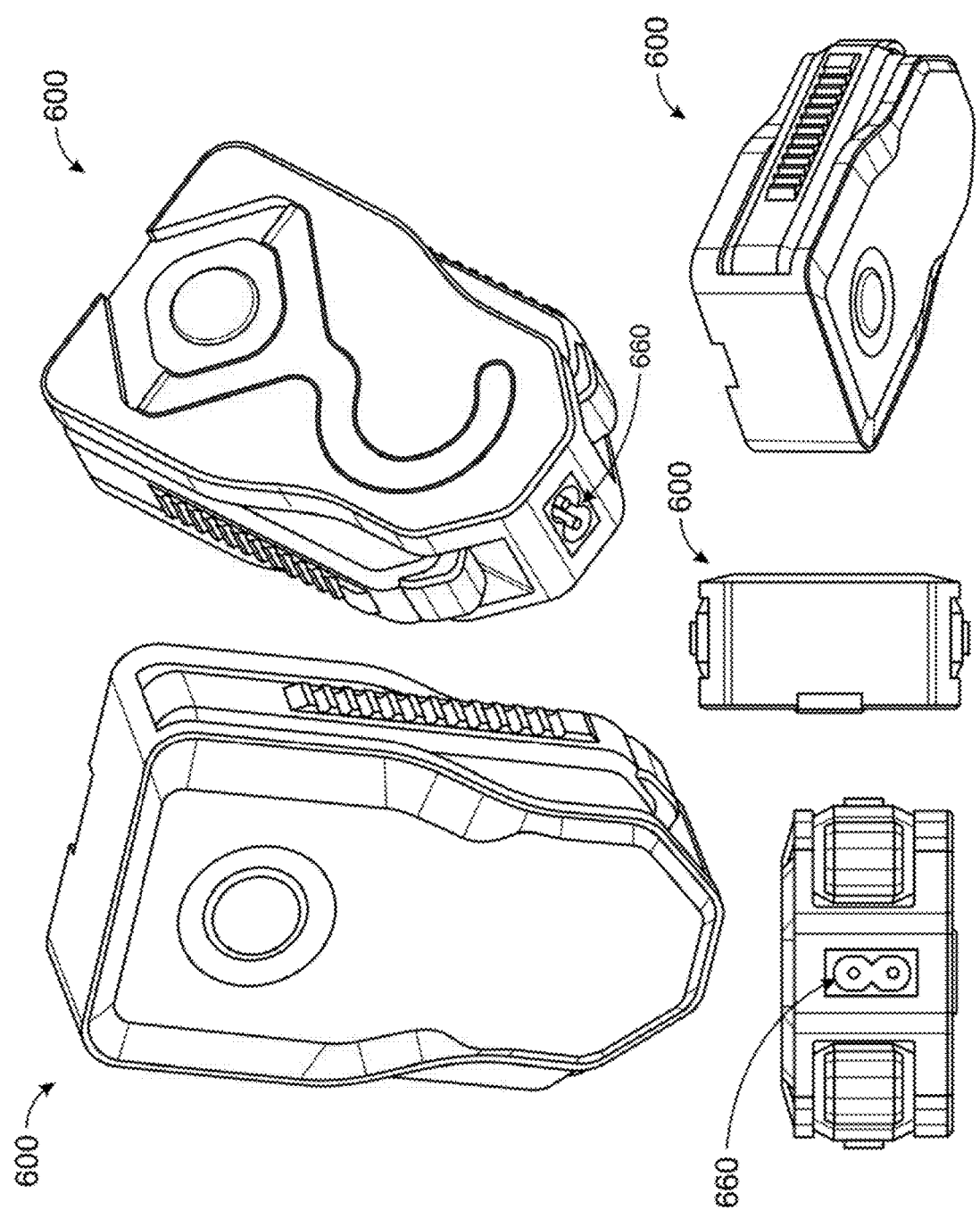
Figure 6H:
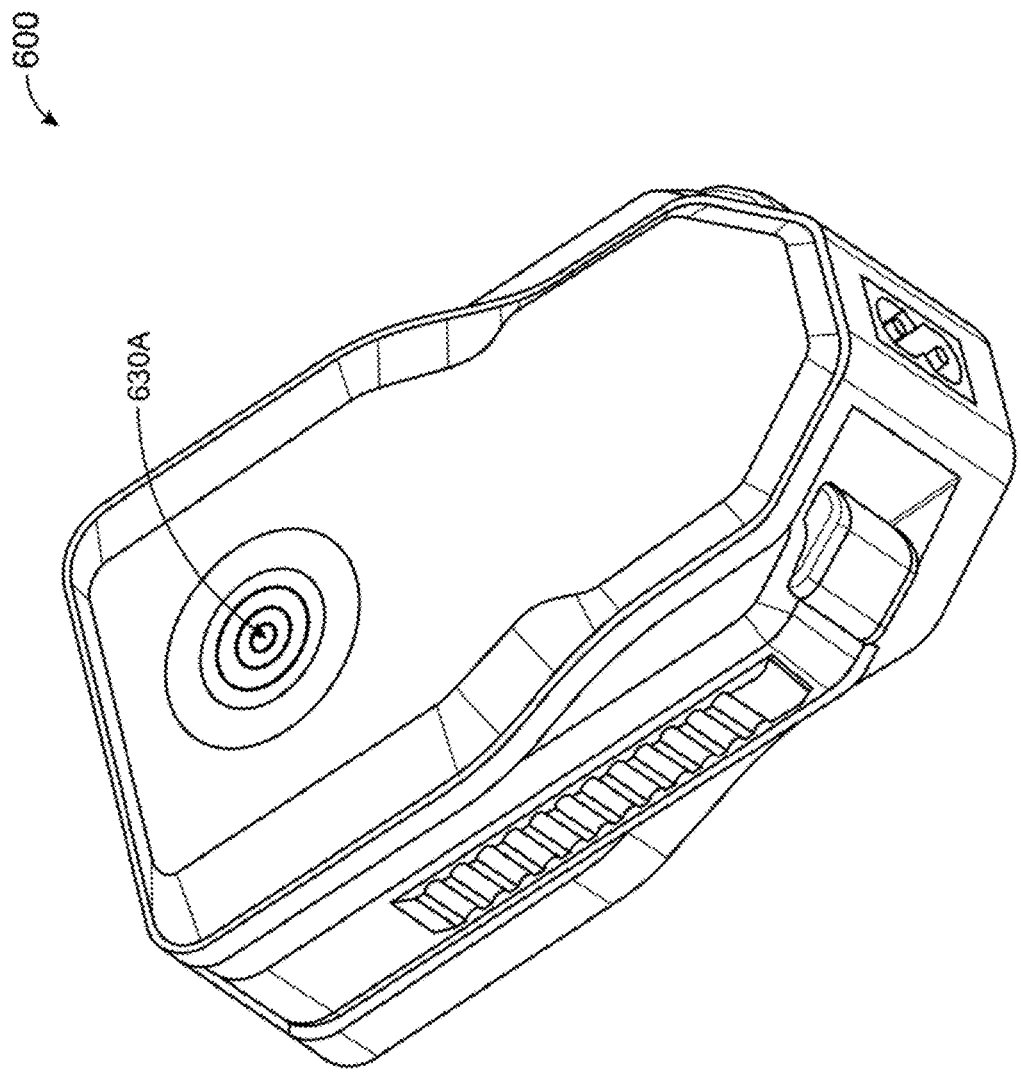
Figure 61:
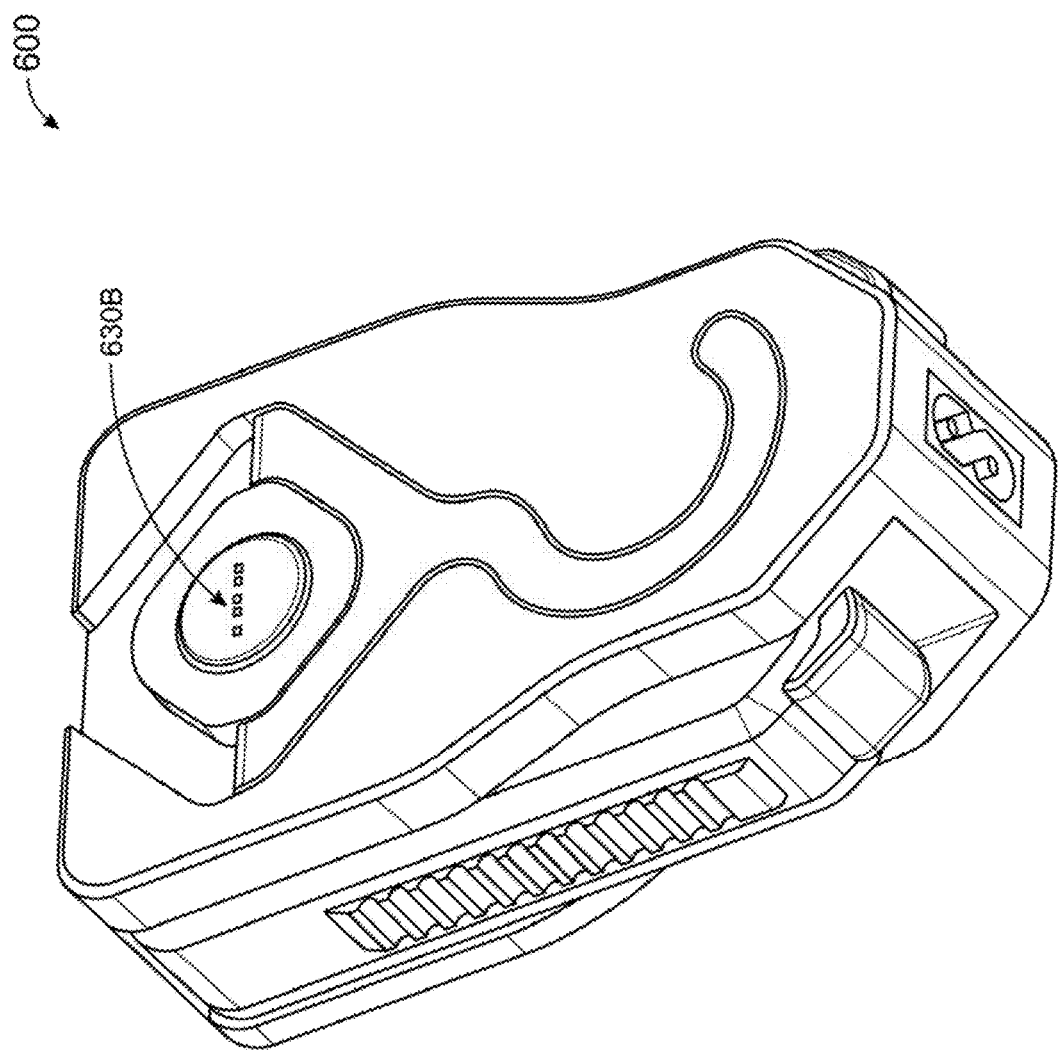

In examples, several hanger charging interfaces may be present on the hanger such as the hanger 200, and, correspondingly, several garment charging interfaces may be present on the garment such as the jacket 100. Including several pairs of garment-hanger charging interfaces, for example, pairs of the interfaces such as the interfaces 145/230, may reduce charging times and increase the likelihood that at least one of the pairs will be functional when a garment is hanged somewhat askew. Examples of such arrangements of multiple hanger charging interfaces are illustrated in FIG. 3, FIG. 4, and FIG. 5.

In embodiments, the interfaces 145 and 230 are or include electrical couplers such as connectors that a user (e.g., the wearer of the jacket 100) plugs into each other when the user hangs the jacket 100 on the hanger 200.

As has already been mentioned, a single hanger may have multiple hanger charging interfaces, and a single garment such as a jacket may also have multiple garment charging interfaces. Note that the multiple hanger charging interfaces included on one hanger may be of different types, as can be multiple garment charging interfaces on a single garment. For example, a mechanical connector-type charging interface may coexist with an inductively coupled charging interface on the same item such as the jacket 100 and the hanger 200. Moreover, multiple hanger charging interfaces may be used to charge multiple garments in parallel, at the same time.

The regulator 160 receives the electrical power from the garment charging interface 145, converts/conditions the received power so it can be used to charge the battery 140, and charges the battery 140 as needed while the interface 145 receives the power from the interface 230. Conversion may include rectification, smoothing/filtering, regulation to a lower or sometimes a higher voltage, and/or other functions. The operation of the regulator 160 may be controlled, in whole or in part, by the controller 155.

In embodiments where the interfaces 145/230 are designed for mechanical coupling (i.e., non-inductive coupling, such as electrical contacts and manually coupled male-female connectors), the power received from the hanger charging interface may be suitable for charging the battery 140 directly, without conversion or conditioning. In such embodiments, all or part of the charging circuitry may be built into or connected to the hanger such as the hanger 200.

The wireless transceiver 150 may be a Bluetooth® transceiver or another type of short range radio frequency (RF) transceiver. The wireless transceiver 150 may be capable of pairing with various other RF devices, such as other Bluetooth®-enabled devices, and sending data to and/or receiving data from these devices. In examples, the wireless transceiver 150 has a communication range of less than 100 meters; in more specific examples, the communication range is less than 10 meters; in still more specific examples, the communication range is less than 1 meter.

The controller 155 may be a general purpose microprocessor or a microcontroller capable of executing code stored in the internal memory of the controller 155, or in another memory that is one of the electrical/electronic components of the jacket 100. The controller 155 may also be a dedicated processor, for example, an application-specific integrated circuit processor, field-configurable processing logic, a number of discrete components implementing control circuitry, or another kind of processor. The controller 155 may be connected to any of the other electrical/electronic components, to change their states and/or read data from these components.

Each of the heating elements 165 may be a resistive heating element, such as a resistive wire, coiled, straight, or otherwise arranged. In embodiments, each or some of the heating elements 165 may include piping allowing a warm/hot fluid or gas ("thermal flow agent") to flow, controlled by a fluid or gas valve that controllably allows and interrupts the flow of the fluid or gas. Note that the thermal flow agent may also or instead carry cooling air or fluid, for controllably cooling the jacket/garment and the wearer of the jacket/garment; in embodiments where the element 165 may provide cooling instead of or in addition to cooling, it may be referred to as a "thermal control element" or "thermal control device." The electrical drive of the element 165 or the state of the fluid/gas valve may be controlled by the processor 155.

The sensors 170 may include biometric sensors, such as heart rate sensors, breathing rate sensors, temperature sensors, blood pressure sensors, movement sensors, and other sensors. The processor 155 may be connected to the sensors 170 to read data from the sensors 170, and to configure the sensors. More generally, the processor 155 may be connected to all or some of the sensors 170 and to any and all other electrical/electronic components of the garment 100 with wired and/or wireless connections; the wired connections may be USB connections; the connections may implement a data bus, serial or parallel. As will be elaborated below, the processor 155 may be connected in the same fashion to sensor(s), processor(s), and/or any other electrical/electronic components of other powered garments, particularly powered garments worn at the time by the same user.

The control button 175 may be coupled to the processor 155 and provide an interface between the wearer of the jacket 100 and the processor. The interface may include both or either input(s) and output(s). In examples, the button 175 includes one or more color LEDs (or other light emitters) that indicate the status of the jacket 100. For example, different colors and/or color intensities emitted by such light emitters may indicate different intensities of the drive to the heating element(s) 165. For example, four different LED colors may indicate 25% of maximum output power, 50%, 75%, or 100%; more generally, any number of power levels may be programmed. The control button 175 may also include a switch, such as a toggle switch. For example, pressing the button may turn the electrical/electronic components on and sequentially increase the power drive to the heating elements 165: pushing it once may turn the drive on at 25% of the maximum output power, pushing the button for the second time may increase the drive to 50%, pushing the button the third time may increase the drive to 75%, and pushing the button the fourth time may increase the drive to full power output, and pushing the button again may turn the power off. The LED colors or intensities may change accordingly, as described in this paragraph and elsewhere in this document.

The control button 175 may also be used to input additional commands to the processor 155 and control multiple functionalities of the garment 100. For example, the wearer can press the control button and hold it depressed for longer and shorter periods of time, and such single button pressings/clicks and/or sequences of long/short pressings/clicks can be interpreted by the processor 155 according to a predetermined correspondence between various commands and single or multiple pressing s/clicks. The predetermined correspondence may be stored, for example, as a table in the internal memory of the controller 155 or in another memory that is one of the electrical/electronic components of the jacket 100. The controller may also activate the lights of the control button 175 and/or other lights that of the electrical/electronic components of the jacket 100, to assist the user in inputting desired commands. For example, if the jacket 100 has several heating panels or zones that can be controlled separately, the user may press the button 175 in predetermined ways to turn from controlling one panel or zone of the jacket 100 to another, and then input power control command once the user selects the desired panel/zone. As the user switches from one panel to another, the processor 155 may turn on LED or another light built into or placed near the currently-controlled panel so that the user can visually confirm that the user is controlling the desired panel. Similarly, LEDs or lights may be built into various sensors and the user may switch from programming one sensor to another and visually confirm the selected sensor. It is also contemplated that in certain embodiments the described visual indicators could be replaced by audible or haptic indicators. As will be elaborated below, additional powered garments may be coupled to the garment 100, particularly powered garments worn at the time by the same user, and be controllable by the garment 100; the control button 175 may be used to program/control these connected powered garments.

In embodiments, the garment charging interface 145 is built into the main label of the garment 100.

The electrical/electronic components of the hanger 200 may include a transformer with a cord pluggable into electric outlets, rectification circuitry, smoothing/filtering circuitry, downconversion and/or regulation circuitry, inversion circuitry for converting the downconverted/regulated AC into AC suitable to drive the hanger charging interface 230. In embodiments, however, the transformer of the electrical/electronic components of the hanger converts the voltage of the AC from the cord to AC at a voltage suitable for driving the hanger charging interface 230. In embodiments, the AC from the cord drives the hanger charging interface 230 directly, without voltage downconversion. In other embodiments, the electrical/electronic components of the hanger 200 include components for producing a DC source that directly, or through a regulator or other downconversion circuitry, can charge the battery 140; this may be the case if the interfaces 145/230 are or include connectors pluggable into each other or contacts touching each other, as has already been mentioned and will be described in more detail below. In another configuration, the electrical/electronic components of the hanger 200 include a battery, which may have capacity larger and even substantially larger (3-15 times) than the battery 140 of the garment 100, and circuitry to convert the X voltage from the battery of the hanger to charge the battery 140 of the garment. For example, the hanger may include an inverter and other circuitry to convert the DC of hanger battery into AC that drives the hanger charging interface 230; as another example, the battery of the hanger charges the battery 140 of the hanger 100 directly or via regulator and/or another type of voltage downconverter, at a lower or sometimes a higher voltage.

FIG. 3 illustrates a hanger 300 with a main body 310, a hook 320, and two hanger charging interfaces 330A and 330B, positioned on each side extension or "wing" of the hanger 300. The hanger charging interfaces 330A/330B may be inductive interfaces and/or contact interfaces, for example. Here and elsewhere in this document and the attached drawings, an inductively-coupled hanger charging interface may but need not extend beyond the surface of the hanger, and may be effective in both front and rear directions. In this way, however the garment is hanged, the hanger charging interface may send electrical power to a corresponding garment charging interface, or charge a powered garment and another device such as a spar battery. Thus, a contact hanger charger interface may have contacts on both its front and rear. Similarly, an inductive hanger charger interface may have sending coils on front and rear; alternatively, a single sending coil may be positioned so that it can couple inductively to receiving coils on both front and rear of the hanger.

FIG. 4 illustrates a hanger 400 with a main body 410, a hook 420, and two hanger charging interfaces 430A and 430B on the different side extensions of the hanger 400, as well as a third interface 430C substantially in the center of and near the hook of the hanger 400. Each of the hanger charging interfaces here may be, for example, a contact interface or an inductive interface. The hanger 400 also includes a hanger charging interface 430D, which is a cord with an electrical connector on its end.

FIG. 5 illustrates a hanger 500 with a main body 510, a hook 520, and charging interfaces 530A and 530B on top of the opposite wings of the hanger 500.

The magnetic coupling of the charging interfaces 145/230 may be extended to additional interfaces of additional devices. For example, the interface 230 may couple to the interface 145 on one side, and at the same time couple to another charging interface on the opposite side.

FIGS. 6A, 6B, 6C, 6D, 6E, 6F, 6G, and 6H illustrate different views of a foldable/portable hanger 600 capable of charging simultaneously a powered garment such as the jacket 100, and one or more other devices, such as one or more batteries for providing electrical power to powered garment(s) or other battery-powered devices. The hanger 600 includes a body 610, a hook 620 that can be folded into a matching hook recess 622 (shown in FIGS. 6C/6D) of the body 610, extenders 655A and 655B that can be lowered into extender recesses on the sides of the body 610, as well as extended, as is shown in some of the Figures. The hanger 600 also includes electrical/electronic components identical, similar or analogous to such components discussed in relation to the hanger 200. Here, the body 610 includes an electrical receptacle 660 on the bottom of the hanger 600 (FIGS. 6F/6G), with prongs configured to receive electric power from a cord with a matching plug on one end. In some examples, the second end of the cord plugs into a wall receptacle (or a similar receptacle) providing common household/office power, say 110/220 VAC. In other examples, the cord also includes a power supply, such as a transformer and possibly also a rectifier/regulator for providing a lower AC or DC voltage to the hanger 600. In still other examples, the cord may connect the hanger 600 to a DC power source such as a battery. The cord or the cord-power supply combination may be considered part of the hanger 600.

The hanger 600 further includes hanger charger interfaces 630A and 630B, on front and rear surfaces of the hanger 600. In FIG. 6, the hanger charging interfaces 630A are the same, one on the front and another on the rear of the hanger 600. One of the interfaces is discussed, with the understanding that the same applies to the other hanger charging interface.

Figure 7A:
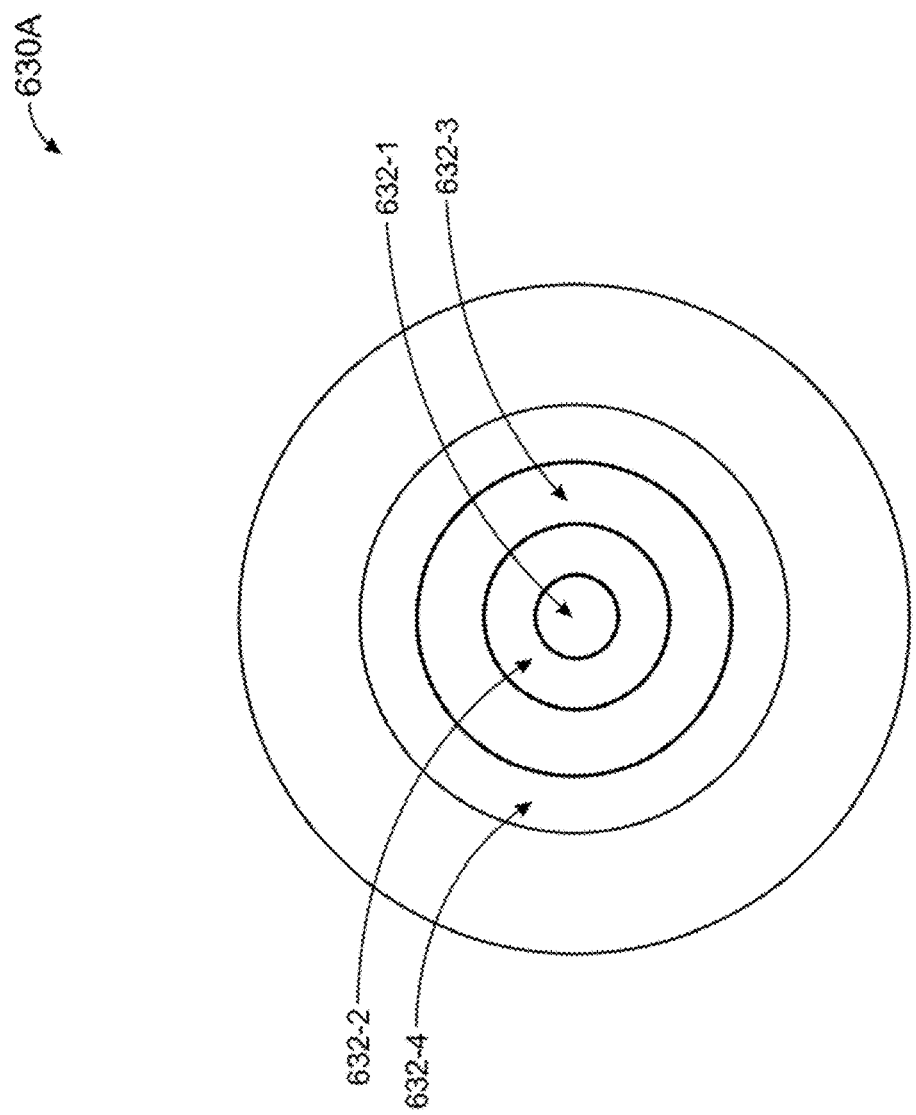

FIG. 7A shows the surface of the interface 630A with four conductive electrical contacts with reference designators 632-1, 632-2, 632-3, and 632-4. The contact 632-1 covers the inside of a circle; and contacts 632-2 through 632-4 are concentric rings separated by insulating material from each other and from the contact 632-1. The contacts of the interface here may correspond to five USB contacts: Ground, Power+, Power−, Data+, and Data−, with the Ground and the Power− contacts combined and connected to the same circle. The USB pinout and inclusion of data transfer pins (such as Data+/Data−) are not necessarily required in all embodiments. Each of the interfaces 630A/630B also includes a magnet internal to the hanger 600. The magnets are for attracting the magnets of the counterpart interfaces (to be discussed) on garment charging interfaces or batteries. The contact 632-1 may be part of a magnet of the interface, or the magnet may be located at the center of and under the surface of the interface 630A.

The hanger charging interfaces 630A/630B also include electrical/electronic components, such as the electrical/electronic components of the hanger charging interface 230 of the charging clothing hanger 200. Here, however, the electrical/electronic components may support two interfaces (630A/630B) rather than a single interface. In examples, however, two sets of some or all of the electrical/electronic interfaces are present, one per interface 630A and 630B.

FIG. 7B shows the surface of an interface 745 that is capable of mating with the interface 630A. The interface 745 may be part of a garment, such as the interface 145 of the garment 100. The external surface of the interface 745 includes five smaller contacts 747-1 through 747-5. "Smaller contact" here means essentially a point contact, with a much smaller area (by at least a factor of 10, or even at least a factor of 100) than the total area of the surface of the interface of which it is a part.

When the illustrated surfaces of the interfaces 630A and 745 come into contact so that the circles on each of the interfaces are concentric, the contact 632-1 (the inside of the conductive circle) will touch the contact 747-1, the contact (conductive ring) 632-2 will touch the contact 747-2, the contact 632-3 will touch the contact 747-3, and the contact 632-4 will touch the contacts 747-4 and 747-5. (Recall that the Ground and the Power− contacts may be combined).

Conductors internal to the interface 630A connect the contacts 632 to the appropriate electrical/electronic components of the interface 630A. In operation, these conductors may carry electrical energy from the garment charging interface 745 to the circuitry of the interface 630A, and carry signals between the two interfaces 630A/745. Analogously, conductors internal to the interface 745 connect the contacts 747 to the appropriate electrical/electronic components of the interface 745. In operation, these conductors may carry electrical energy from the garment charging interface 745 to the interface 630A, and signals between the two interfaces.

As was already mentioned, the garment charging interface 630A includes a magnet at the center. The garment charging interface 745 also includes a magnet at its center, under the surface with the contacts 747. The two magnets are disposed (located) and oriented (North/South) so that they attract and bring the two surfaces together, concentrically, and the contacts 632 and 747 touch each other as is described above, and enable the flow of electrical energy from the interface 745 to the interface 630A, as well as flow of signals between the two interfaces. Note, however, that interface of the charging device (e.g., of the charging hanger) may be like the interface 630, and the garment interface may be like the interface 745; here, the flow of energy and the flow of signals would be reversed.

In examples, the two hanger charger interfaces 630A and 630B are identical or analogous, but facing in different directions. In other examples, the hanger charger interfaces 630A and 630B are different: one such as the interface 630A with the circle and ring contacts and a locating magnet, the other with the rectangular or otherwise shaped smaller footprint contacts as described and shown above in relation to the interface 745; such embodiment is illustrated in FIG. 6I. (For this reason, the surface of the interface 630B in some of the Figures does not show details.) Moreover, the two interfaces may be of different types, for example, one being a contact-based interface such as the interface 630A, the other being an inductive interface.

FIGS. 8A, 8B, 8C, and 8D illustrate selected features of a charger 800 with a garment charger interface 845, which is identical, similar, or analogous to the garment interface discussed above. The charger 800 also includes prongs 870 that may be plugged into a wall outlet, and a port 875 that may be a USB port capable of providing DC power and communicating using the USB industry standard. The electrical/electronic components of the charger 800 may be identical, similar, or analogous to the electrical/electronic components of the charging clothing hanger 200, for example, including a transformer for downconverting the AC voltage from the wall outlet, rectification circuitry, smoothing/filtering circuitry, and DC regulation circuitry that provides DC voltage for charging a powered garment coupled to the hanger charging interface 845.

Figure 9A:
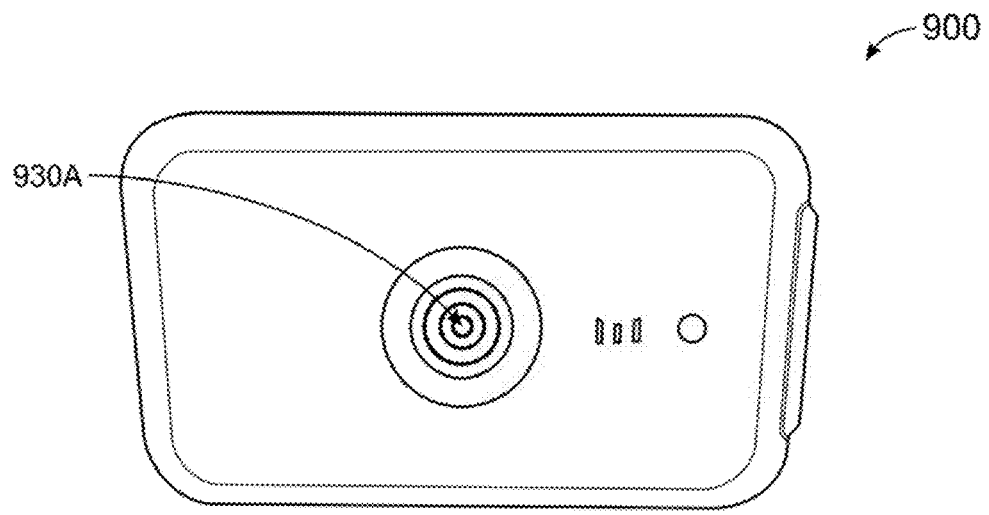
FIGS. 9A and 9B illustrate selected components of a stackable garment battery with magnetically coupled mechanical charging interfaces, in accordance with selected aspects described in this document.
Figure 9B:
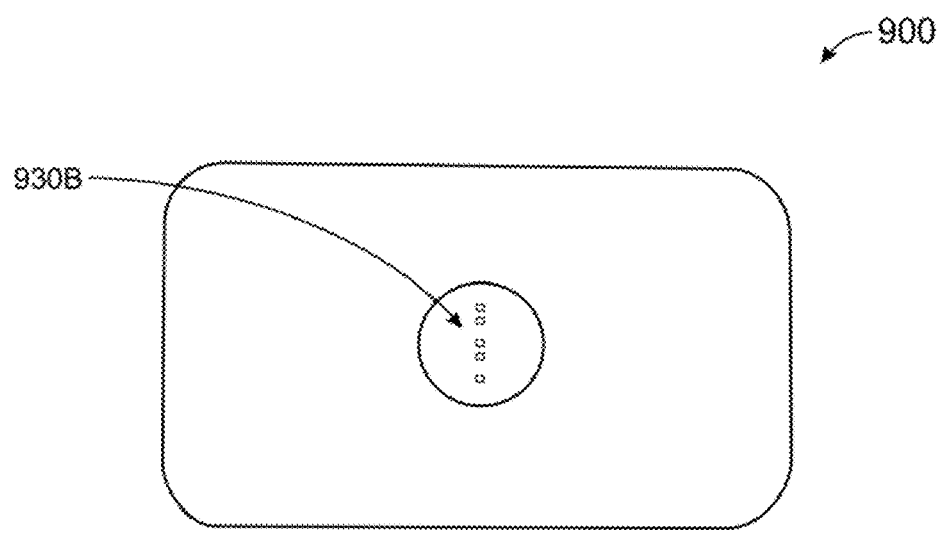

FIGS. 9A and 9B illustrate different views of a garment battery 900, which is pluggable into a power receptacle of a powered garment, to provide electrical power to the garment. The garment may be such as the garment/jacket 100 and the battery 900 may be used as the battery 140. Note charger interfaces 930A and 930B on opposite sides of the battery 900. These interfaces are identical, similar, or analogous to the hanger charger interfaces 630A and 845, discussed above. Here, the interface 930A is compatible with the interface 845 of the wall-pluggable charger 800. Moreover, the interfaces 930A are mutually compatible, meaning that an interface 930A of one battery 900 can be connected to an interface 930B of another battery 900. Thus, the smaller (rectangular) contacts of the interface 845 of the charger 800 will touch the circular (inside the central circle, rings) contacts of the interface 930A when the two interfaces are brought together; the smaller rectangular contacts of the interface 930B of a first battery 900 will touch the circular contacts of the interface 930A of a second battery 900. Additionally, the magnets under the surfaces of the interfaces 830/930A/930B have such polarities that different interfaces attract: the interface 845 will therefore be attracted to the interfaces 930A; and the interface 930B on the first battery 900 will be attracted to the interface 930A of the second battery 900. And recall that the magnets are positioned so that the interfaces tend to be centered under the forces of magnetic attraction, so that the coupling of the two interfaces is proper for transmission of electrical power from the charger 800 to the batteries 900, and from one battery to another.

Figure 10:
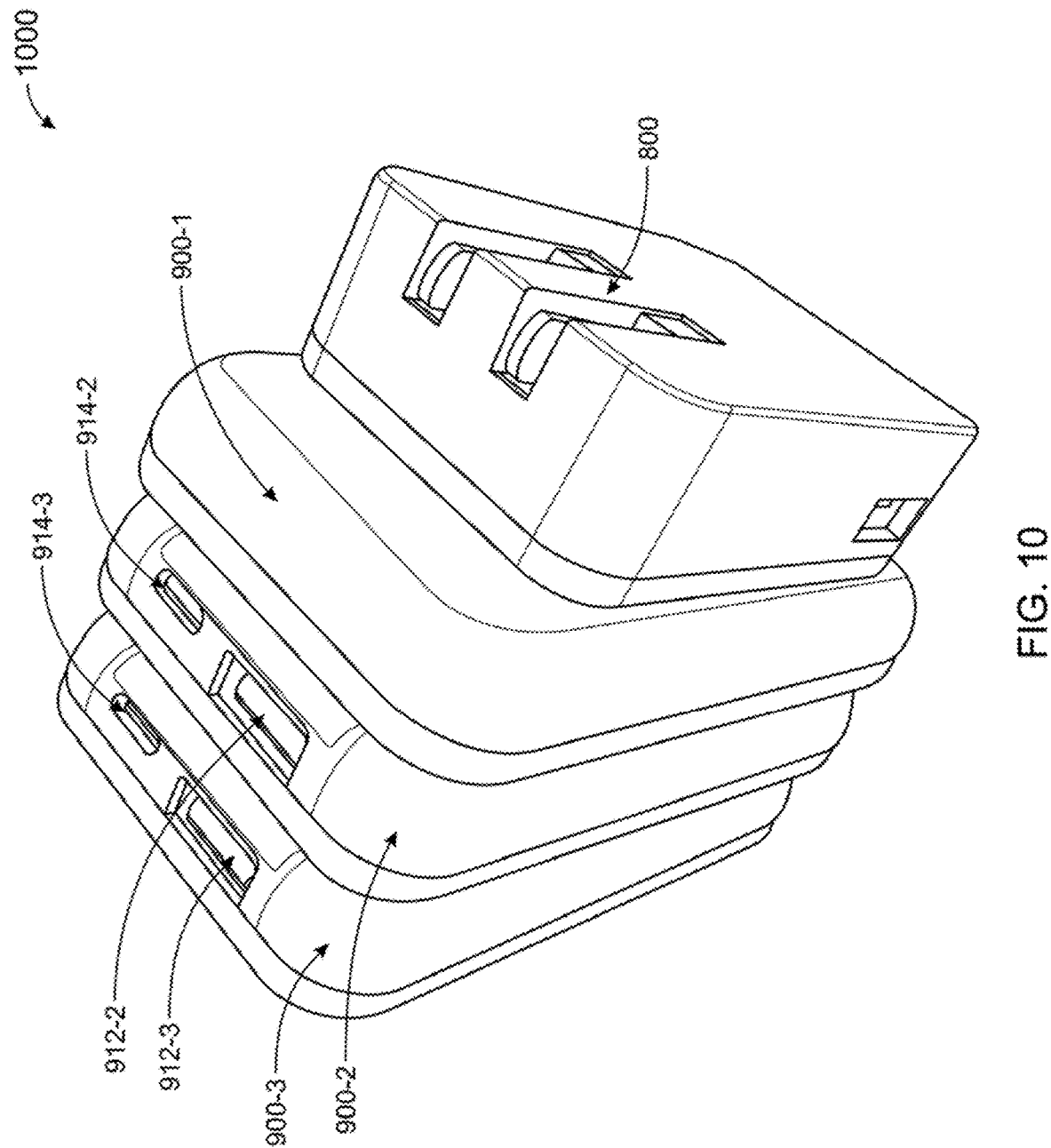
FIG. 10 illustrates selected features of a combination of a charger as in FIGS. 8A and 8B with multiple batteries as in FIGS. 9A and 9B, in accordance with selected aspects described in this document.

FIG. 10 illustrates selected features of a combination 1000 of a charger 800 and three batteries 900. Note a port 912-2 on the battery 900-2 and a port 912-3 on the battery 900-3. These are for connecting the batteries 912-2 and 912-3, respectively, to the garment electronics, and possibly to other devices. The battery 900-1 has the same type of port on its lower side/edge, which is not visible in FIG. 10. As a person skilled in the art would readily understand after careful perusal of this document and the attached drawings, the circular contacts of the interface 930A (the contacts 632 in FIG. 7A) enable coupling the interfaces 930A (or 630A in FIG. 7A) to the interfaces 930B (or 745 in FIG. 7B, or 845 in FIGS. 8A/8B) regardless of the relative circular orientation of the two devices (of the battery 900-1 relative to the charger 800, and the battery 900-1 relative to the battery 900-2, etc.). Thus, the batteries 900 and the charger 800 can be rotated 360 degrees on the axis that goes through the centers of the round interfaces 930A/930B.

Note also a port 914-2 on the battery 900-2 and 914-3 on the battery 900-3. These ports may be physically and/or electrically different from the ports 912, and may also be used for connecting the batteries to the garment electronics and/or to other devices.

Figure 11A:
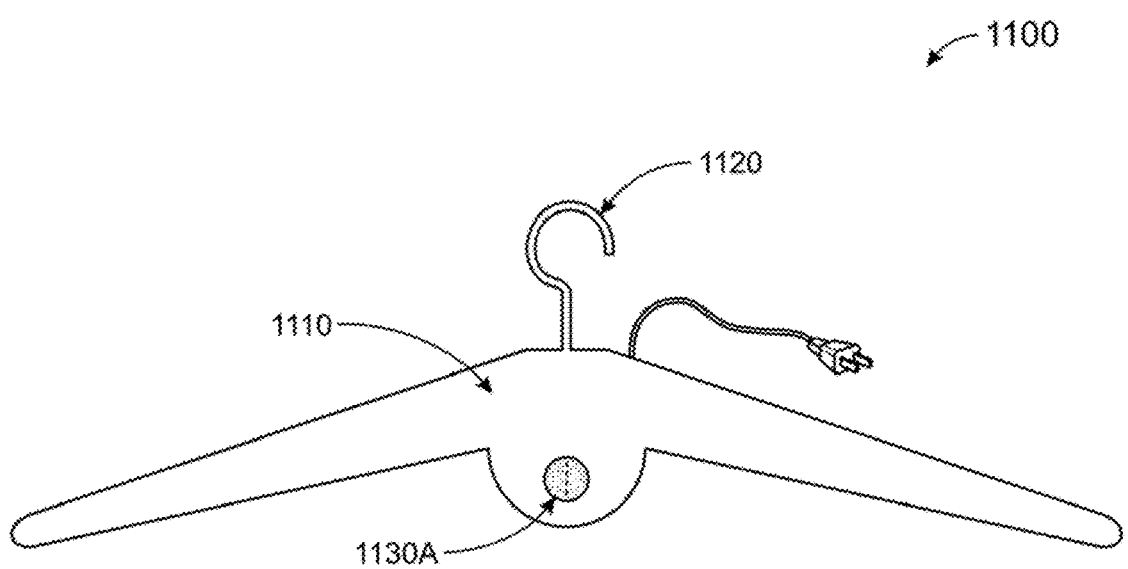
FIGS. 11A and 11B illustrate selected components of a charging clothing hanger with magnetically coupled charging interfaces on front and rear, in accordance with selected aspects described in this document.
Figure 11B:
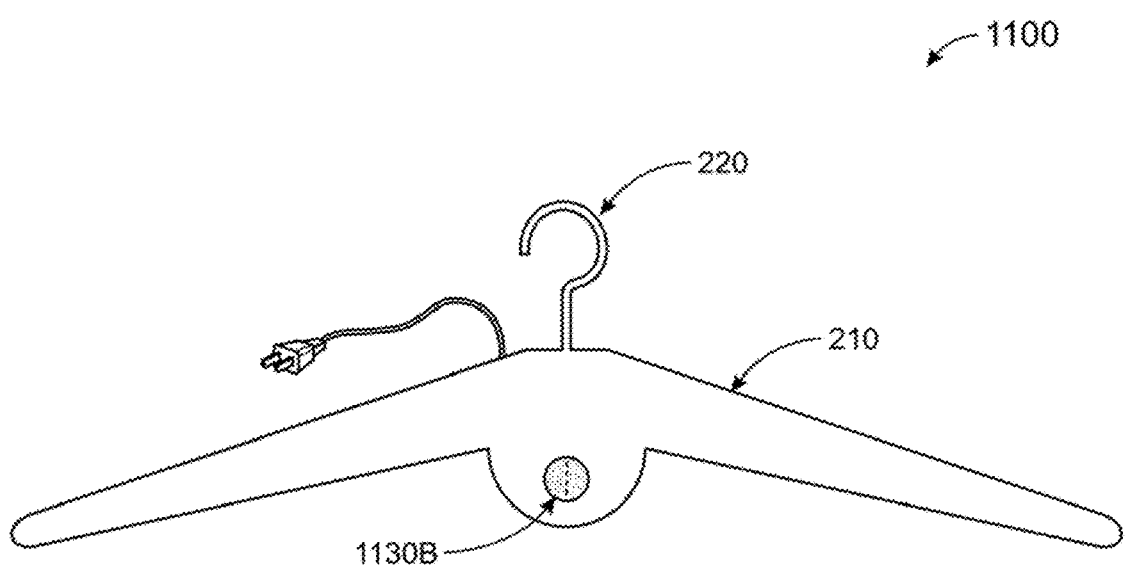

Let us now turn back to the hanger 200 and its hanger charging interface 230. In embodiments, the interface 230 includes an interface 230-1 and an interface 230-B, respectively on the front and rear of the hanger. A single interface may be implemented with two surfaces and placed so as to enable charging of garments/batteries from both front and rear, for example, including interface surfaces such as 630 on both front and rear, as has already been mentioned in relation to FIG. 6. FIG. 11A and FIG. 11B show, respectively, selected features of the front and rear of a hanger 1100, which is a version of the hanger 200 with this arrangement. The hanger 1100 includes a body 1110, a hanging hook 1120, hanger charging interfaces 1130A and 1130I, and electrical/electronic components for charging and/or interfacing with the jacket 100. Any two or more of the components of the hanger 1100 may be combined. Each of the interfaces 1130A/1130B is similar to the interface 830 of the charger 800. FIG. 8; it has five smaller contacts, such as the contacts 747-1 through 747-5, arranged in the same way. The interface 145 of the garment 100 may then be such as the interface 930A of the battery 900. When the garment 100 is hanged on the hanger 1100, the interface 145 will be near the interface 1130A (or 1130B, depending on the way the garment 100 is hanged). The two interfaces will be attracted because of their internal magnets, and will couple with each other and stay coupled, so that the circular contacts of the interface 145 will touch the smaller contacts of the interface 1130A (or 1130B, as the case may be), allowing transfer of electrical energy and/or data between the hanger 1100 to the garment 100. A battery 900 may be coupled to the other interface 1130B (or 1130A, as the case may be), and be charged at the same time. Moreover, additional batteries may be attachably/removably stacked in an arrangement such as the arrangement 100 illustrated in FIG. 10, and be charged at the same time.

In embodiments, the interfaces 1130A and 1130B are such as the interfaces 930A and 630A, with circular contacts; and the interface 145 of the garment 100 is then such as the interfaces 745 and 845, with smaller rectangular contacts.

Figure 12:
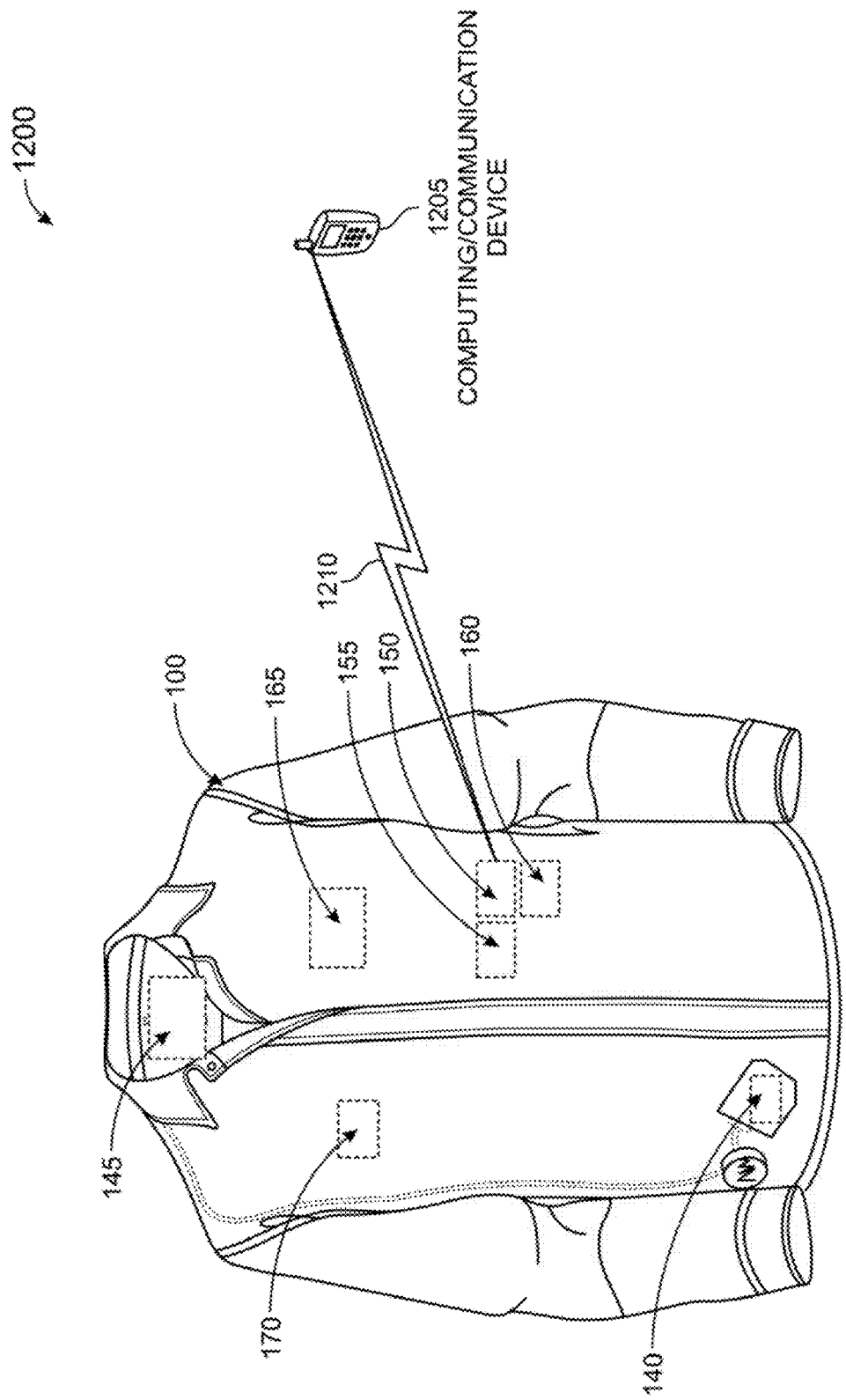
FIG. 12 illustrates selected components of a combination of a powered garment with a portable device such as a smartphone configured to interface and control the powered garment, in accordance with selected aspects described in this document.

FIG. 12 illustrates selected parts of a combination 1200 that includes a powered garment 100 (such as is described in relation to FIG. 1) or another powered garment (including all feature combinations and feature permutations described and suggested in this document and the attached drawings). The combination 1200 also includes a portable device 1205, for example, a mobile device such as a smartphone, a tablet, a smart watch, a computer. The portable device 1205 includes a processing system of one or more processors and related/supporting components (memories, I/O, etc.) The portable device 1205 also includes one or more first radios, such as cellular transceivers. WiFi transceivers, and similar Radio Frequency (RF) receivers and/or transmitters. The portable device 1205 also includes a second radio, which would typically (but not necessarily) be an RF radio, e.g., a receiver, a transmitter, or both. The second radio is compatible with the wireless transceiver 150 of the garment 100. As shown in FIG. 12, the portable device 1205 communicates with the garment 100 via a link between the second radio of the portable device 1205 and the transceiver 150 of the powered garment 100. For example, the link 1210 may be a Bluetooth® link, possibly a Bluetooth® Low Energy (BLE) link.

The portable device receives an "app" (software designed to run on portable/mobile devices, such as smartphones/tablets). The app may be, for example, preloaded on the portable device 1205, downloaded to the portable device 1205, transferred to the portable device 1205 through a wired connection, and/or reside in firmware built into or connected to the portable device 1205. The powered garment 10 includes counterpart software (another app) that is designed to communicate and interact with the app on the portable device 1205.

The two apps, executing by the respective processors of the portable device 1205 and the powered garment 100, configure the portable device 1205 and the powered garment 100 to establish the link 1210, and to perform various steps/actions described and illustrated in this document and the attached drawings. Thus, the user/wearer of the powered garment 100 can control the functionality of the powered garment 100 through the portable device 1205, including the control functions described above in connection with the control button 175. Exemplary functions that the user can perform through the portable device 1205 include: selecting one or more zones/panels of the garment 100 for subsequent action(s); turning on and off heat in one more zones/panels of the garment 100; increasing/decreasing the power level of all or selected zone(s); obtaining a reading of the remaining battery charge level and estimated remaining power-on time; selecting one or more sensor(s) of the garment 100; obtaining data from all or selected sensors of the garment 100; and others. The functions may also relate to additional powered garments of the user/wearer that are connected to the garment 100. This will be discussed below.

Figure 13:
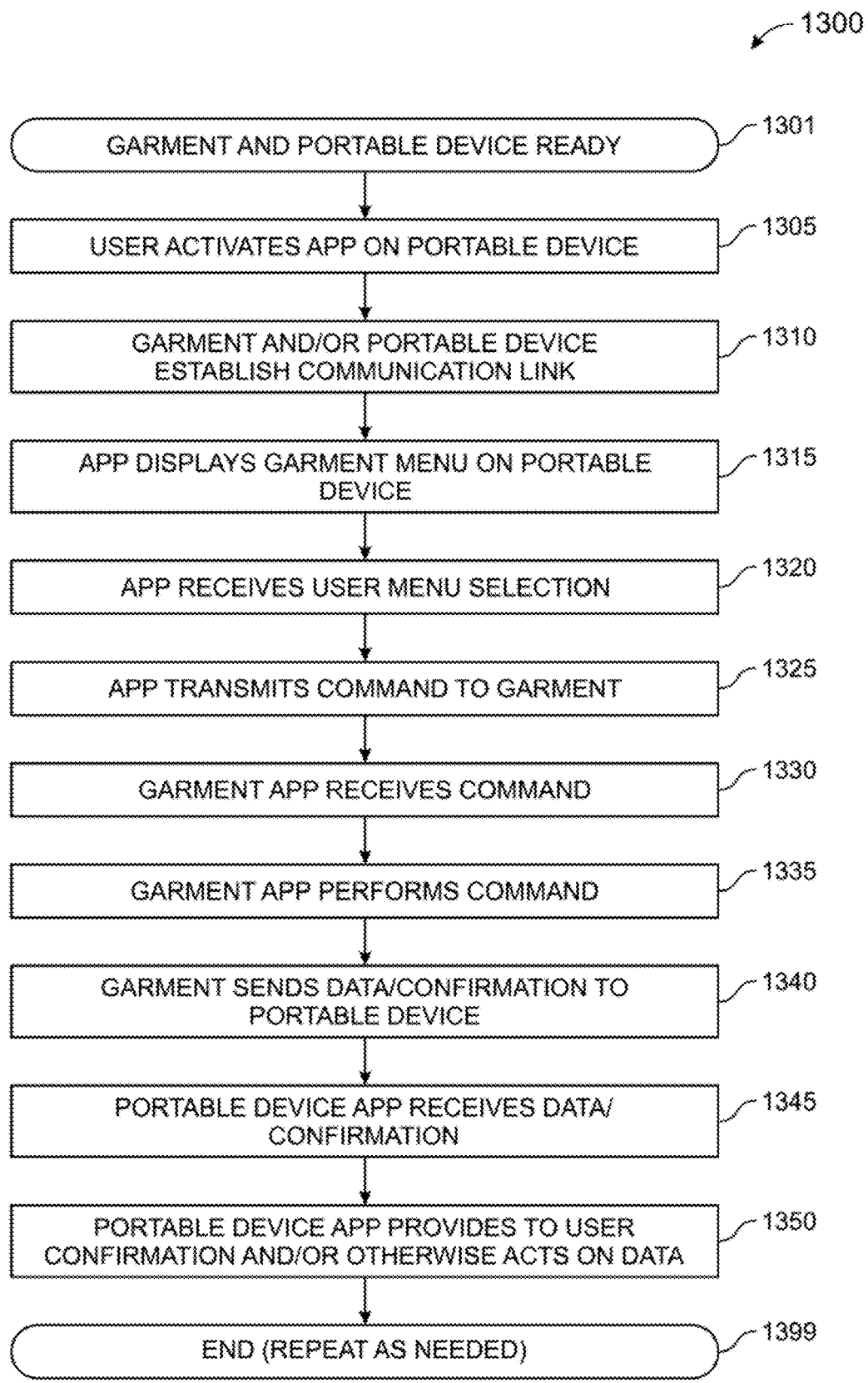
FIG. 13 illustrates selected steps of a process for performing a user-selected function by a powered garment, in accordance with selected aspects described in this document.

FIG. 13 illustrates selected steps of an exemplary process for performing a user-selected function by a powered garment.

At flow point 1301, the appropriate apps are present in the user mobile device and the garment, the user mobile is powered up, and the electronics in the powered garment are turned on and initialized.

In step 1305, the user activates the app on the mobile device.

In step 1310, the mobile device app and the software in the electronics of the powered garment establish a communication link, such as a Bluetooth® link.

In step 1315, the mobile device app displays to the user of the mobile device a menu or menus of commands. In variants, the app otherwise provides to the user a selection of commands, for example, with pre-recorded instructions.

In step 1320, the app receives the user's selection; for example, the user touches the selection on the menu, or articulates the selection for the mobile device's voice recognition software that communicates with the app.

In step 1325, the app generates a command that corresponds to the user's selection and transmits the command via the link to the powered garment.

In step 1330, the electronics of the powered garment receive the command, through the link and a transceiver of the garment's electronics.

In step 1335, the processing system of the garment (such as a microprocessor/microcontroller) interprets/recognizes the command and causes the garment to perform the command. For example, it selects one or more zones/panels, turns on or off heat in one more zones/panels of the garment, increases/decreases the power level of the zones/panels, measures or recalls from a memory remaining battery charge reading, selects sensor(s) of the garment, obtains data from the sensor(s).

In step 1340, the electronics of the powered garment send via the link data and/or a confirmation/acknowledgement to the mobile device. For example, the acknowledgement may simply confirm that the command has been received and/or acted on. As another example, the data transmitted may include sensor data. As still another example, the data may include battery state of the powered garment or current power setting of one or more panel(s)/zone(s).

In step 1345, the mobile device receives via the link the data and/or confirmation/acknowledgement from the garment.

In step 1350, the mobile device (executing the app) provides to the user the confirmation/acknowledgement and/or the data and/or some information derived from the data. For example, the mobile device may provide sound and/or haptic indication of the acknowledgment. As another example, the mobile device displays the data or the information.

The process may then end at flow point 1399, and may be repeated as needed or desired.

Figure 14:
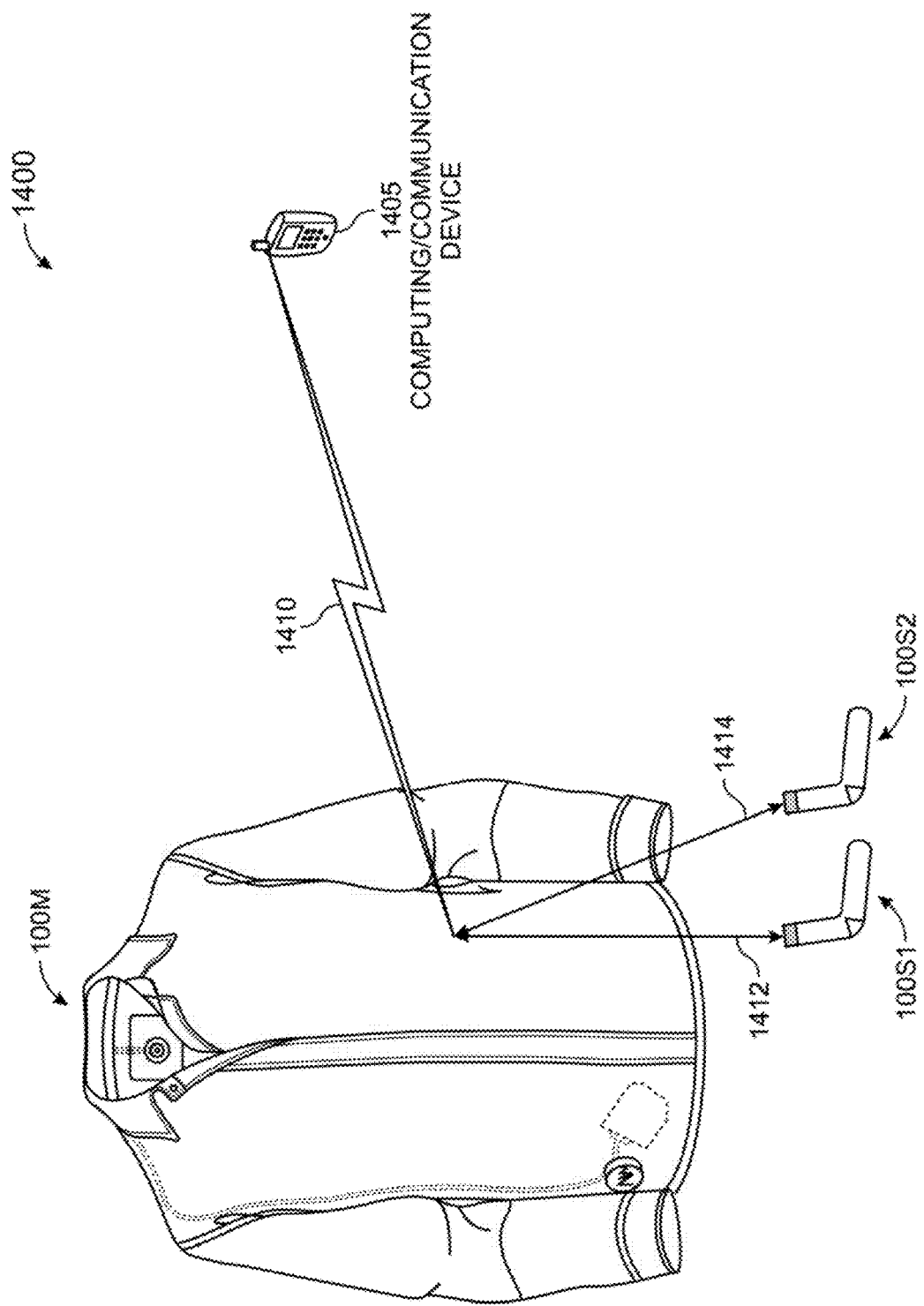
FIG. 14 illustrates selected components of a combination of a portable device such as a smartphone with a powered master garment and two powered slave garments, in accordance with selected aspects described in this document.

FIG. 14 illustrates selected parts of a combination 1400 that includes three powered garments: a "master garment" 100M, a first "slave garment" 100S1, and a second slave garment 100S2. Each of these powered garments may include any of the features of the powered garment of FIGS. 1/12, and other features described throughout this document and illustrated in the attached drawings, including features related to master-slave operation of the combination 1400 described below.

The combination 1400 also includes a portable device 1405 such as the mobile device of FIG. 12. A powered garment app is preloaded onto the mobile device 1405, and each of the powered garments 100M/100S1/100S2 includes counterpart apps designed to communicate with the app on the portable device 1405. Operational and other details of this embodiment may be identical, analogous, or similar to such details described above in connection with the combination 1200, with additional features of the apps that relate to master-slave operation.

The four apps (on each of the powered garments 100M/100S1/100S2 and the portable device 1405), executed by the respective processors of the garments and the mobile device, configure the portable device 1405 and the powered garments 100M/100S1/100S2 to establish a link 1410 between the master garment 100M and the portable device, and links 1412/1414, between the master garment 100M and slave garments 100S1 and 100S2, respectively. The instructions further configure the portable device 1405 and the garments 100M/100S1/100S2 to perform various steps/actions. Through the established links, the user/wearer of the powered garments 100M/100S1/100S2 can control the functionality of the powered garments through the portable device 1405, including the control functions described above in connection with the control button 175. Exemplary functions that the user can perform through the portable device include: selecting a powered garment from among the garments 100M/100S1/100S2 for subsequent action(s)/commands; selecting one or more zones/panels of the garment 100M/100S/100S2 for subsequent action(s); turning on and off heat in one more zones/panels of the garments 100M/100S1/100S2; increasing/decreasing the power level of all or selected garment(s) or zone(s); reading the remaining battery charge level and estimated remaining power-on time for the garments 100M/100S1/100S2; selecting one or more sensor(s) of the garments 100M/100S1/100S2; obtaining data from all or the selected sensors of the garments 100M/100S1/100S2; and others.

As a person skilled in the art would understand after careful perusal of this document and the attached drawings, the configuration 1400 can be reduced to a single slave garment, or extended with additional slave garments connected to the master garment 100M.

Although FIG. 14 shows the garment 100M as a jacket and the garments 100S1/100S2 as socks, other powered garments can be substituted for each of these garments.

The communication link 1410 can be identical, similar, or analogous to the link 1210 of FIG. 12, and can be established in the same, similar, or analogous way. The communication links 1412 and 1414 between the electronic/electrical components of the master garment 100M and the electronic/electrical components of the slave garments 100S1 and 100S2 may be wireless and established automatically by the electronic/electrical components of the powered garments, or by the app of the portable device 1405 directing the powered garment 100M to perform the requisite steps. These garment-to-garment links may also be wired connections. For example, the user may plug into each other corresponding connectors of the powered garments 100M/100S1 and/or 100M/100S2. Once the wired connections are made, the links can also be established automatically or with the app of the portable device 1405 directing the process. Either way, each of these connections is established and the master garment 100M can communicate with the slave garments 100S1 and 100S2, for example, transmitting data and/or commands to the slaves, and/or receiving data from the slaves. Moreover, the apps of the garments and the portable device 1405 configure the garments/device so that the portable device can control the slaves, transmit data to the slaves, and/or receive data from the slaves, with the control commands and the data going through the master 100M.

Figure 15:
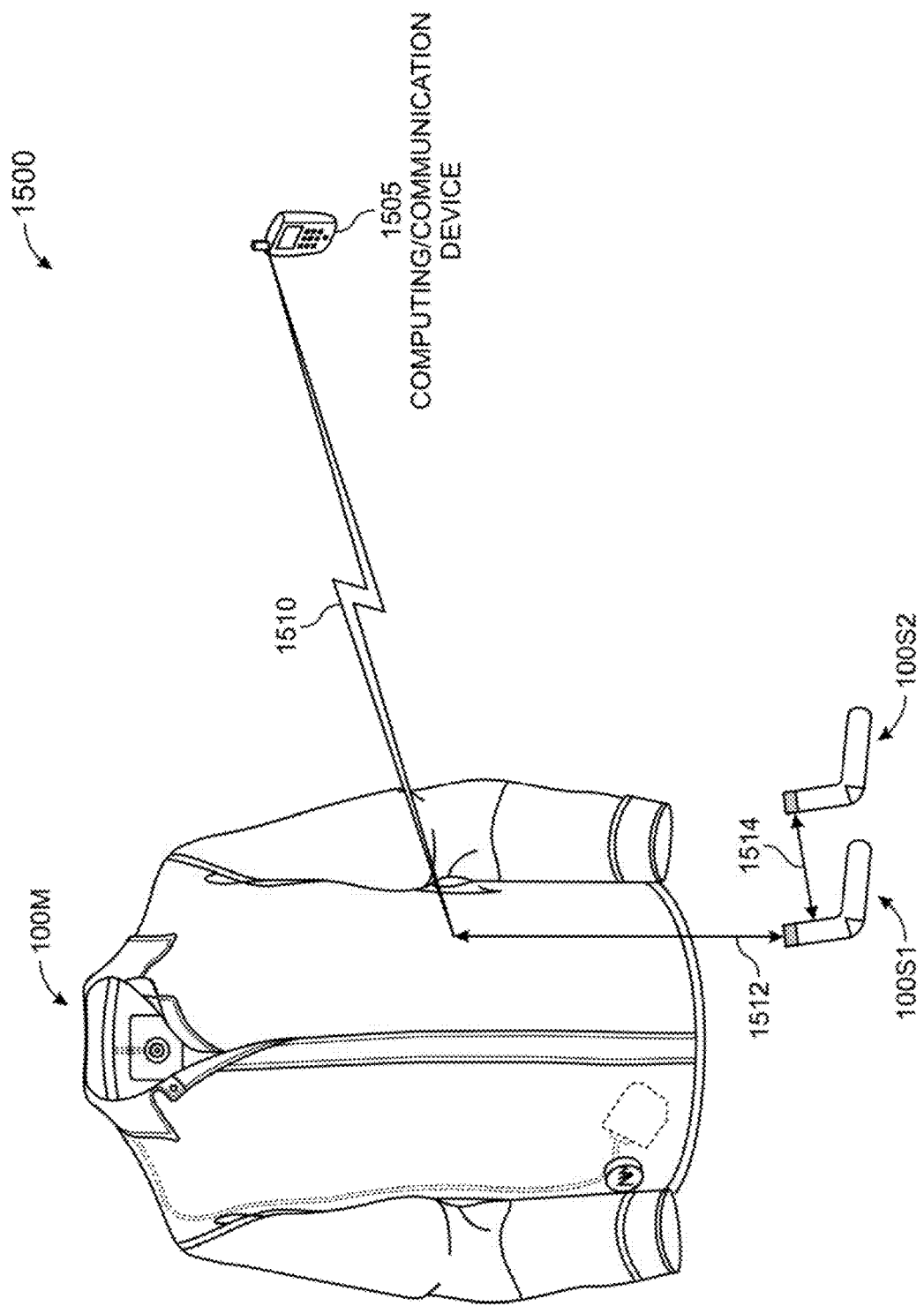
FIG. 15 illustrates selected components of another combination of a portable device such as a smartphone with powered master garment and two powered slave garments, in accordance with selected aspects described in this document.

FIG. 15 illustrates selected parts of a combination 1500 that is similar to the combination 1400 described above. Thus, the garments 100M/100S1/100S2 are identical, similar, or analogous to the identically-designated garments of the combination 1400; portable device 1505 may be identical, similar, or analogous to the portable device 1405; and connections 1510 and 1512 may be identical, similar, or analogous to, respectively, the connections 1410 and 1412. Here, however, the second slave garment 100S2 is connected to the first slave garment 100S1 by connection 1514. The connection 1514 may be wired or wireless, and otherwise identical, similar, or analogous to the connection 1512. Additionally, the apps in the powered garments 100M/100S1/100S2 and the portable device 1505 enable the portable device to control and exchange data with the second slave garment 100S2; the commands and/or data between the portable device 1505 and the second slave garment 100S2 in this embodiment flow through both the master garment 100M and the first slave garment 100S1.

As a person skilled in the art would understand after careful perusal of this document and the attached drawings, the configuration 1500 can be extended with additional slave garments so that commands and data between the portable device 1505 and the additional garments flow through the link 1510 and multiple slave-to-slave links. Moreover, additional "primary" slave garments may be connected to the master garment 100M, and still more "secondary" slave garments may be connected to the master garment 100M through the primary slave garments. The user can then control the master garment 100M and all the slaves from the portable device 1505.

In embodiments, power drive to one or more garments (masters and/or slaves), panels, and/or zones is adjusted automatically in response to a sensor indicating a change in the ambient conditions. The sensor may be a temperature sensor placed at or near the outside layer of a garment, and the power drive may be increased or decreased when an abrupt change in the temperature is detected by the software of the garment or of another garment or an app of a mobile device communicating with the garment. An abrupt temperature change may be indicated if the temperature sensor reading indicates that the temperature change rate $(\text{TEMP}_{current}-\text{TEMP}_{previous})/(\text{TIME}_{current}-\text{TIME}_{previous})$ exceeds a predetermined rate limit. Thus, the system may be configured to decrease or turn off the power drive in response to an ambient temperature increase exceeding the rate limit. Similarly, the system may be configured to increase or turn on the power drive in response to the absolute value of the ambient temperature decrease exceeding the rate limit; or in response to the absolute value of the ambient temperature decrease exceeding the rate limit and the ambient temperature being below a predetermined "cold" temperature. In embodiments, an analogous method is employed with thermal flow agents, to increase/decrease heat provided to one or more garments of a user, and/or to increase/decrease cooling provided to the one or more garments.

Figure 16:
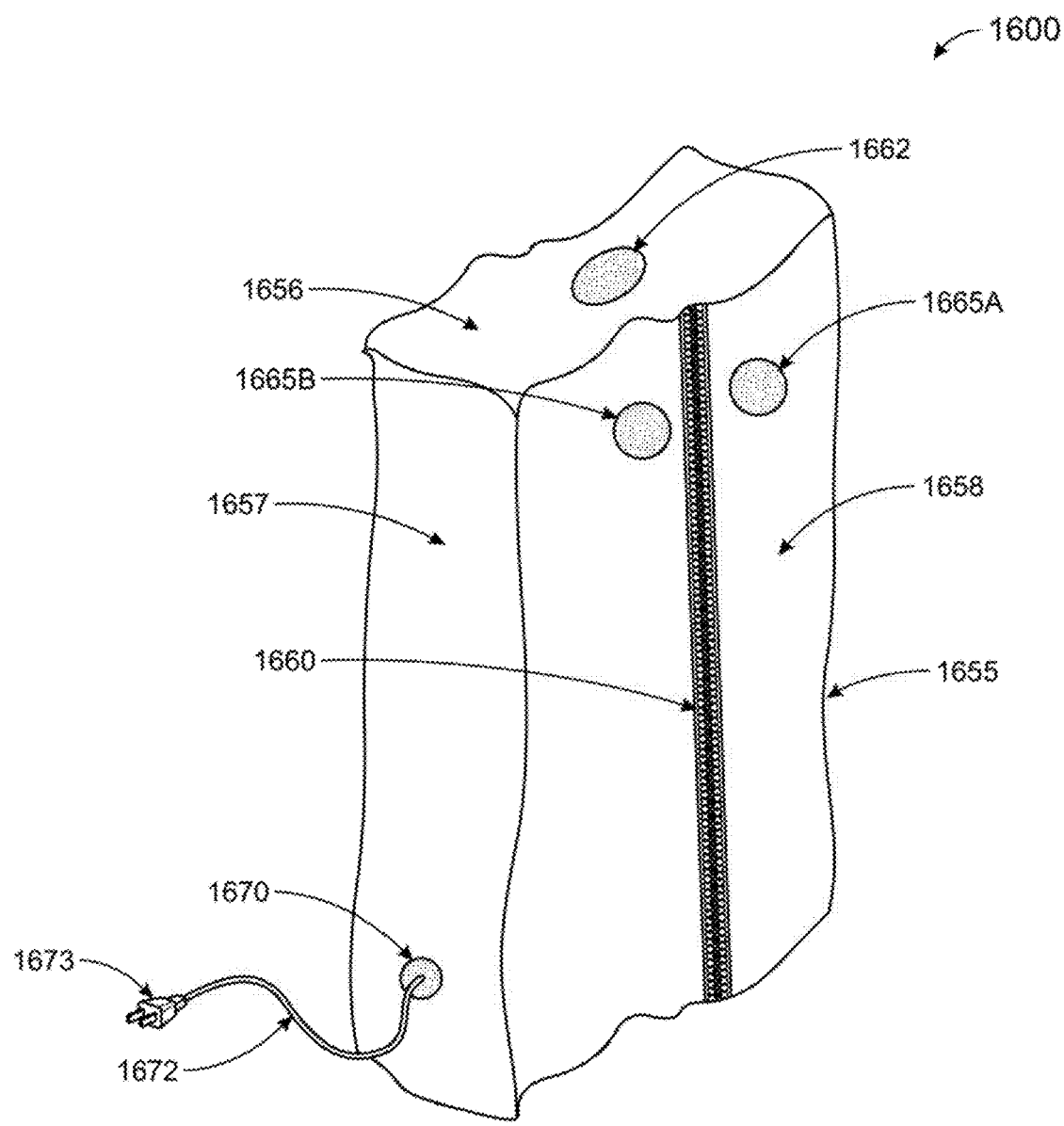
FIG. 16 illustrates selected features of a garment travel bag with a built-in garment charger and data interface(s), in accordance with selected aspects described in this document.

A garment carrier/bag or a closet may incorporate any of the features of the hangers discussed throughout this document, and provide the same or similar/analogous functionality. The features may be included in a hanger built into such a garment carrier/bag/closet, or provided by the carrier/bag/closet without reliance on the hanger. As an example, FIG. 16 is a front perspective view illustrating selected features of a garment travel bag 1600 with a built-in garment charger and data interface(s) (wired or wireless). The garment travel bag 1600 includes a bag body 1655, which may be made, for example, of vinyl, leather, textile, or another material used for such garment storage devices. The bag body 1655 includes a top 1656, a first (right) side 1657, and a front 1658. There may also be other external areas, to wit, a back, a bottom, a second/left side, but these are not visible in the Figure. A zipper or another length fastener 1660 is located vertically on the front 1658 and allows inserting garments into, and removing garments from, the bag body 1655. A top opening 1662 may be provided to facilitate the use of hanger(s) (whether conventional or as described in this document) with the garment travel bag 1600.

A pair of enclosure charging interfaces 1665A/1665B are built into, or attachable to, the garment travel bag 1600, for coupling to the garment charging interfaces of the garment(s) inside the bag body 1655. The enclosure charging interfaces 1665A/1665B may be identical, analogous, or similar to the hanger charging interfaces that have already been discussed at some length, including relatively-low frequency (e.g., <100 KHz) inductive charging interfaces, contact interfaces such as the interfaces 630A/630B with circular and smaller rectangular contacts, pluggable connectors, and induction exciters operating at radio frequencies. In examples, the enclosure charging interfaces 1665A/1665B may not be visible from outside. There may be just a single enclosure charging interface, or more than two such enclosure charging interfaces. Moreover, the one or more enclosure charging interfaces may be located in various positions and on different sides (left, right, front, rear, top, bottom) of the garment travel bag 1600, and need not be circular but fabricated in different shapes. A power cord 1672 protrudes through an opening 1670, and has a plug 1673 on its end, for connecting to the power grid and providing electrical power to the garment travel bag 1600 and for charging the garments inside the garment travel bag 1600. The garment travel bag 1600 also includes electronics, which are not visible in the Figure. As has already been mentioned, the electronics may provide garment charging capability, and communication transceivers (e.g., cellular transceivers. Bluetooth® transceivers, WiFi transceivers, other RF transceivers, wired transceivers such as Ethernet) for connecting to the garments in/near the garment travel bag 1650, and/or connecting to other networks, including connecting directly or indirectly to wide area networks.

In conclusion, notice that not every illustrated/described step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples/implementations use the particular order(s) in which the steps and decisions (if applicable) are shown and/or described.

The features (elements/limitations) described/illustrated throughout this document and the drawings may be present individually, or in any combination or permutation, except where the presence or absence of specific features is inherently required, explicitly indicated, or is otherwise made clear from the description/drawings. This applies whether or not the features appear related to specific embodiments; in other words, features of one described or illustrated embodiment may be included in another described or illustrated embodiment.

The instructions (machine executable code) corresponding to the method steps of the embodiments, variants, examples, and implementations disclosed in this document and the attached drawings may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for powered garments, chargers of such garments, interconnections of such garments, and operation/configuration of such garments and chargers. This was done for illustration purposes and, therefore, the foregoing description and the drawings are not necessarily intended to limit the spirit and scope of the invention(s) described. Neither the specific embodiments nor their features necessarily limit the general principles underlying the invention(s). The specific features described/illustrated herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A clothes storage system, comprising:
   a garment enclosure designed to receive and store at least one garment;
   an electromagnetic radiator;
   power circuitry configured to provide electrical drive to the electromagnetic radiator to cause the electromagnetic radiator to radiate radio frequency (RF) power for conversion to DC charging power used to recharge batteries of powered garments; and
   a system-garment data interface configured to establish short range wireless communication links;
   wherein the electromagnetic radiator, the power circuitry, and the system-garment data interface are built into the garment enclosure.

2. A clothes storage system according to claim 1, wherein the garment enclosure comprises a garment bag.

3. A clothes storage system according to claim 1, wherein the garment enclosure is a closet.

4. A combination, comprising:
   a clothes storage system according to claim 1; and
   a powered garment inserted into the clothes storage system, the powered garment comprising:
   a battery,
   an electromagnetic radiation receiver, and
   a battery charger coupled to the battery and to the electromagnetic radiation receiver, the battery charger being configured to receive the RF power radiated by the electromagnetic radiator of the clothes storage system and received by the electromagnetic radiation receiver of the powered garment, to convert the RF power into DC electrical power suitable for charging the battery, and to charge the battery using the DC electrical power.

5. A combination according to claim 4, wherein the powered garment further comprises:
   one or more electrical energy-consuming components powered by the battery.

6. A combination according to claim 5, wherein the one or more electrical energy-consuming components comprise a heating element.

7. A combination according to claim 5, wherein the one or more electrical energy-consuming components comprise a processing module, a radio frequency transceiver, one or more biometric sensors, and one or more environmental sensors.

8. A method of storing garments, the method comprising:
   providing a combination according to claim 5; and
   placing the powered garment into the clothes storage system.

9. A method according to claim 8, further comprising turning on the clothes storage system thereby causing the power circuitry to cause the electromagnetic radiator to radiate RF power and charge the battery of the powered garment.

10. A method according to claim 9, wherein the garment enclosure comprises a garment bag and the step of placing comprises inserting the powered garment into the garment bag.

11. A method according to claim 10, wherein:
    the one or more electrical energy-consuming components of the powered garment comprise a processing module, one or more environmental sensors, one or more biometric sensors, and a radio frequency transceiver configured to establish a short range wireless communication link with the system-garment data interface of the clothes storage system;

the method further comprising:

sending sensor data collected by the one or more sensors of the powered garment from the powered garment to the clothes storage system through the link between the radio frequency transceiver of the powered garment to the system-garment data interface of the clothes storage system; and receiving the sensor data by the clothes storage system through the link.

* * * * *

UNITED STATES PATENT AND TRADEMARK OFFICE
CERTIFICATE OF CORRECTION

| | | |
|---|---|---|
| PATENT NO. | : 11,395,519 B2 | |
| APPLICATION NO. | : 16/703825 | |
| DATED | : July 26, 2022 | |
| INVENTOR(S) | : Bean et al. | |

It is certified that error appears in the above-identified patent and that said Letters Patent is hereby corrected as shown below:

In the Specification

Column 20, Line 66, cancel "link between" and replace with --link 1210 between--;

Column 21, Line 11, cancel "10 includes" and replace with --100 includes--;

Column 22, Line 28, cancel "garment of" and replace with --garment 100 of--;

Column 22, Line 34, cancel "device of" and replace with --device 1205 of--;

Column 22, Line 58, cancel "device" and replace with --device 1405--;

Column 22, Line 62, cancel "100M/100S/100S2" and replace with --100M/100S1/100S2--;

Column 23, Line 34, cancel "device can" and replace with --device 1405 can--.

Signed and Sealed this
Fourth Day of October, 2022

Katherine Kelly Vidal
*Director of the United States Patent and Trademark Office*